(12) United States Patent
Valdespino

(10) Patent No.: US 6,792,872 B1
(45) Date of Patent: Sep. 21, 2004

(54) BALLOON CAR AND AERIAL TROLLEY SYSTEM

(76) Inventor: Joseph M. Valdespino, 5023 Golf Club Pkwy., Orlando, FL (US) 32808

( * ) Notice: Subject to any disclaimer, the term of this patent is extended or adjusted under 35 U.S.C. 154(b) by 0 days.

(21) Appl. No.: 10/329,612

(22) Filed: Dec. 26, 2002

(51) Int. Cl.[7] .............................. A63G 1/00; B61B 7/00
(52) U.S. Cl. ......................................... 104/22; 104/112
(58) Field of Search ............................. 104/22, 87, 89, 104/112, 115, 117.1; 212/71, 76

(56) References Cited

U.S. PATENT DOCUMENTS

| | | | |
|---|---|---|---|
| 152,145 A * | 6/1874 | McGlashan | 244/33 |
| 372,381 A | 11/1887 | Muller | |
| 433,941 A * | 8/1890 | Hight | 104/22 |
| 446,786 A | 2/1891 | McDonnell | |
| 541,102 A * | 6/1895 | Lomax | 104/22 |
| 586,590 A | 7/1897 | Brodbeck | |
| 654,687 A | 7/1900 | Suter | |
| 981,462 A * | 1/1911 | Moss | 104/22 |
| 1,028,010 A | 5/1912 | Fawkes | |
| 1,051,093 A | 1/1913 | Fawkes | |
| 1,119,646 A * | 12/1914 | Hans | 244/116 |
| 1,300,555 A | 4/1919 | Behrens | |
| 1,349,593 A * | 8/1920 | Ullmann | 244/116 |
| 1,468,508 A | 4/1923 | Nilsson | |
| 1,465,246 A * | 8/1923 | Lemm | 244/116 |
| 1,551,655 A * | 9/1925 | Geisler | 244/116 |
| 3,448,864 A | 6/1969 | Fenn et al. | 212/71 |
| 3,670,658 A * | 6/1972 | Stelling | 104/22 |
| 3,865,251 A | 2/1975 | Langford | 212/71 |
| 4,055,316 A | 10/1977 | Chipper et al. | 244/33 |
| 5,527,000 A | 6/1996 | Tsai et al. | 244/116 |
| 6,145,679 A | 11/2000 | Walters | 212/76 |

* cited by examiner

Primary Examiner—S. Joseph Morano
Assistant Examiner—Robert J. McCarry, Jr.
(74) Attorney, Agent, or Firm—Brian S. Steinberger; Law Offices of Brian S. Steinberger P.A.

(57) ABSTRACT

An aerial balloon railway and system of using the same including balloon-carriage assembly having at least one balloon structure and at least one carriage structure for accommodating passengers and/or cargo which operates through a single or network railway system, whereby the balloon-carriage assembly travels above and along a triangulated track system by at least one drive cable assembly.

18 Claims, 13 Drawing Sheets

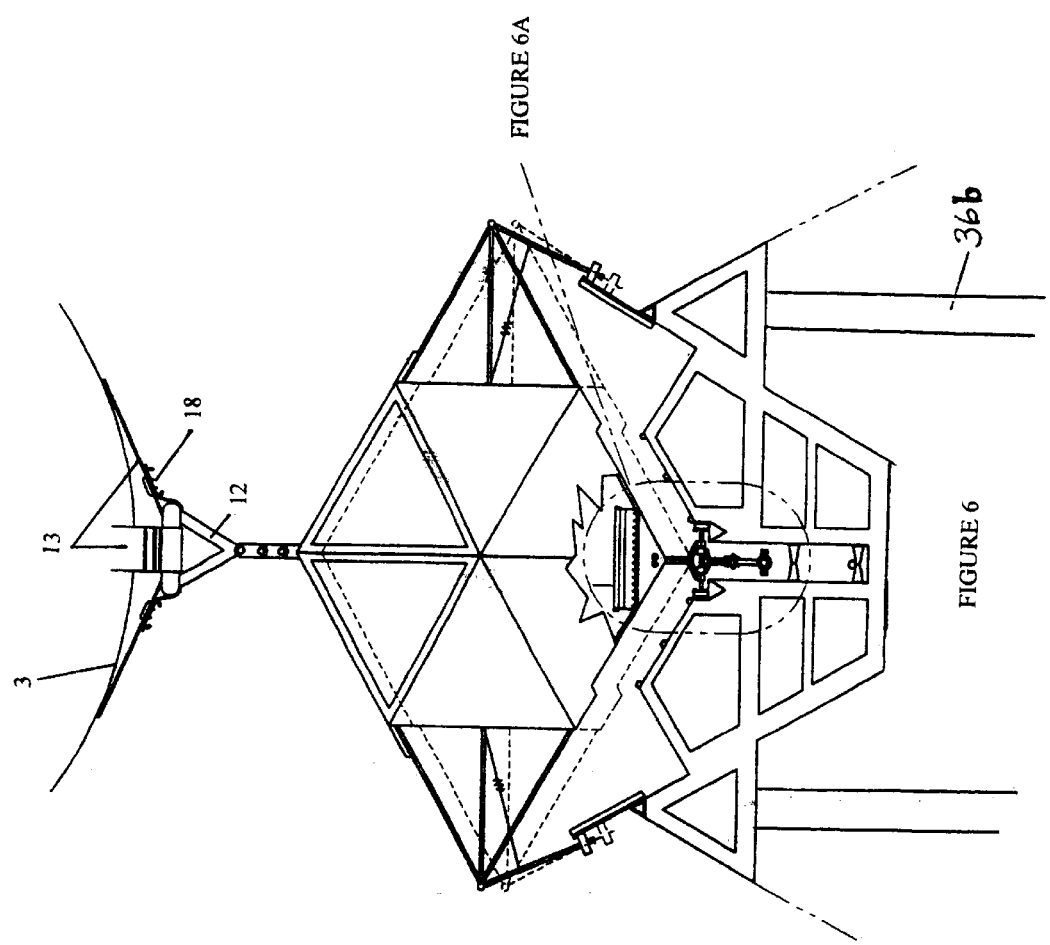

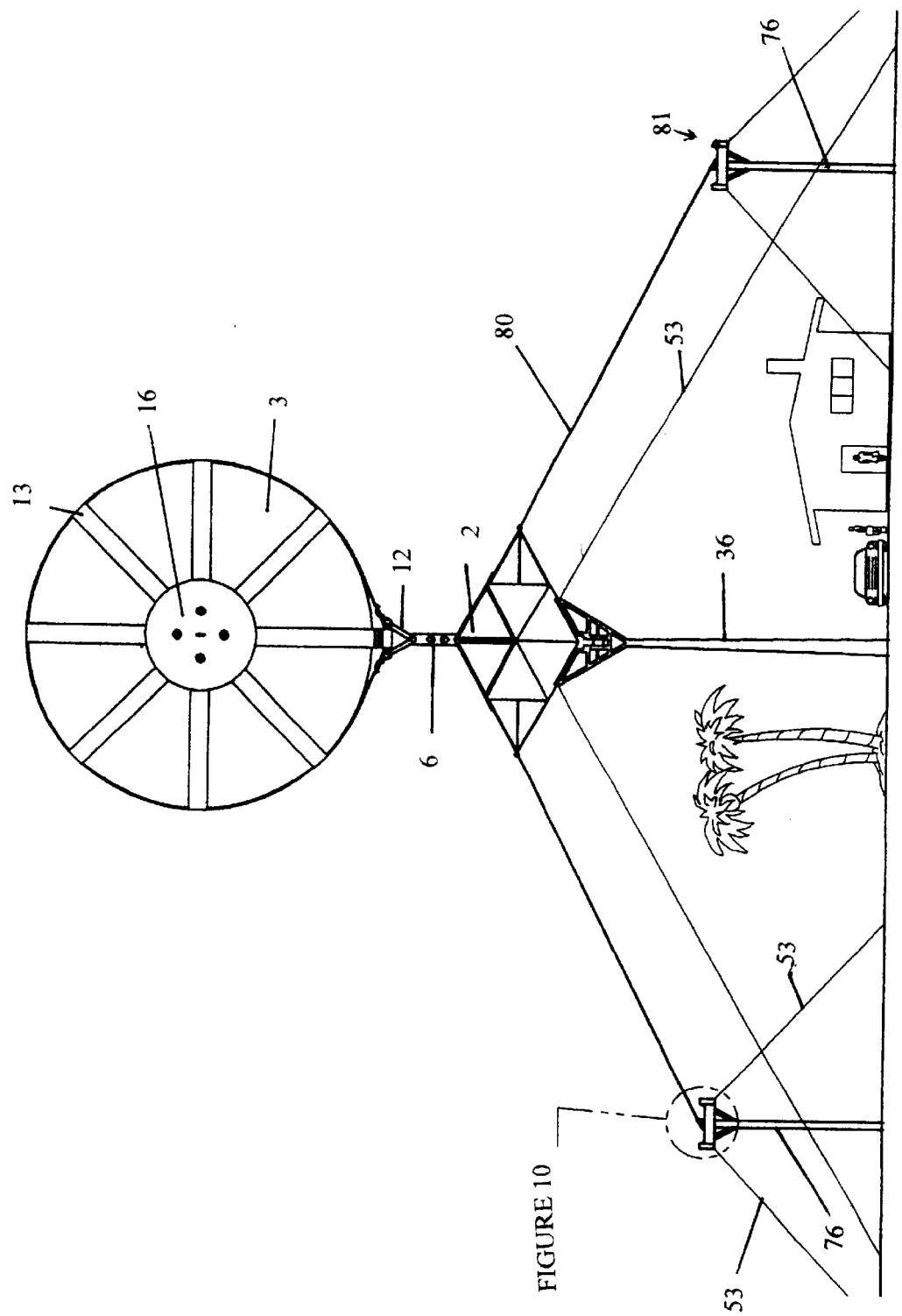

BALLOON CAR AND AERIAL TROLLEY SYSTEM

FIELD OF THE INVENTION

The present invention relates to a novel continuous and stable aerial trolley system for the transport of passengers or other cargo across land or shallow water bodies in one or more carriage assemblies suspended from a 'lighter-than-air' balloon apparatus, and with the carriage(s) secured to, and guided by, and propelled along a continuous and elevated track system in a stable and energy-efficient manner.

BACKGROUND OF THE INVENTION

Concurrent with the evolution of airships, others proposed systems that employed lighter-than-air balloon-craft to lift cargo, but which used ground-based equipment and cables to tether said balloon-craft and guide them to their destination. In 1887, Muller proposed the first known of such devices (U.S. Pat. No. 372,381). Muller proposed dual balloon craft guided along ropes or steel cables strung in parallel between two fixed towers, with one of said towers being at higher elevation than the other (on an incline). Muller's scheme was clever, but his system was limited to short distances up and down inclines, and his design was wrought with terrible instability problems. In 1891, McDonnel proposed a similar system (U.S. Pat. No. 446,786), which also lacked a continuous track system and also posed serious instability problems.

Some other simple and effective schemes of cable-guided and cable-propelled balloon craft have been successfully deployed in the foresting industry for moving logs across inclined tracts of timberland. These systems are traditionally called skylines. Skylines typically involve the use of a lighter-than-air balloon to lift a suspended bundle of logs, and co-attachment of the suspended load to a cable strung between two or more opposing winch systems that are anchored at opposite ends of the tract to be forested. Examples are Patents by Fenn (1969—U.S. Pat. No. 3,448,864), Langford (1975—U.S. Pat. No. 3,865,251), and Walters (2000—U.S. Pat. No. 6,145,679). Skylines are effective and energy-efficient at moving non-fragile, inanimate objects. However, skylines lack any means to stabilize the suspended load against twisting and rocking motions, thus making them inadequate for transport of human passengers. Furthermore, all known skylines lack a continuous track system, and thus are very limited in range.

Finally, and most relevant to the present invention, other systems have been proposed where aerial balloon craft are secured to, and guided along continuous land-based track systems. These have traditionally been referred to as 'aerial trolleys'. These were the first tethered aerial balloon craft proposals that promised potential to transport passengers and/or cargo over appreciable distances.

In 1897, Brodbeck (U.S. Pat. No. 586,590) proposed a balloon-suspended carriage with attachment of said carriage to a taughtly drawn pair of steel cables via trolley wheel attachments that allowed free rolling movement along said cables. The proposed craft was to be propelled by an aero-propeller mounted to the carriage with said aero-propeller driven by an electric motor. Brodbeck suggested a plurality of track masts to support said cables and thus enable a continuous track system. However, Brodbeck's proposed system was very unstable and prone to severe tilting and/or rocking motion from side to side, especially in the presence of strong cross winds.

In 1900, Suter (U.S. Pat. No. 654,687) proposed a simple scheme whereby an aerial balloon with suspended gondola was guided along a single taught cable, with said cable being extended continuously and supported by a plurality of track masts. The craft was tethered to a trolley wheel assembly that rolled along the cable. Propulsion of Suter's craft along the guide cable was to be effected by simple buoyancy of the balloon craft. As such, his system was limited to inclined terrain and had very limited range. Furthermore, Suter's craft posed severe carriage instability problems, similar to a skyline. Furthermore, Suter's track mast support design as explained would have been woefully inadequate to withstand lateral forces of any appreciable cross winds as exerted upon the balloon and transmitted to the track mast via the cable connection.

In 1912, Fawkes (U.S. Pat. No. 1,028,010) combined the features of prior patents by Brodbeck and Suter, and proposed a self-propelled aerial balloon craft that was secured to and guided by a continuous cable-way. His cable-way with support masts was nearly identical to Suter's except that it could also be applied to horizontal terrain due to the provision of a self-propulsion mechanism. His propulsion scheme involved a plurality of aero-propellers attached to the carriage, with said propellers all being driven by a single on-board electric motor. Regardless, Fawke's device had the same basic inadequacies and limitations as Suter's device (inadequate carriage stability and inadequate track support).

In 1923, Nilsson (U.S. Pat. No. 1,468,508) proposed an aerial trolley system whereby the balloon-suspended carriage was secured to and guided along a more robust steel rail type of track system. His track system featured a single long and straight steel rail track supported by a plurality of track masts at regularly spaced intervals. His design also featured two trolley devices that gripped onto and rolled across said railway. Said trolley devices were attached to bottom of the carriage at its front and rear ends by flexible linkage members, thereby tethering the carriage and balloon to the track by virtue of the trolley devices as they interact with the railway. Nilsson's system was the first to propose an aerial trolley system where both the balloon and carriage floated and rode above the track system. However, Nilsson's proposed use of flexible linkages from the carriage of the balloon craft to the trolleys which engaged the track made his craft especially vulnerable to sideways tilting and rocking motions, thus posing grossly inadequate stability for the transport of human passengers or fragile cargo.

Finally, another prior art device that is pertinent to the present invention, but not heretofore associated in any way with lighter-than-air balloon craft, nor with aerial trolleys, was the 'cable-car' invented and developed by Andrew Hallidie in 1873. Hallidie's system featured a simple carriage with wheels that ran along a pair of parallel steel rails, with said carriage being propelled by linkage to a cable-drive system that was located below the railway (below ground) and oriented longitudinally down the track centerline. His cable drive scheme consisted of a very long length of steel cable, with its terminal ends connected to each other so as to form a large 'endless' loop. Said cable loop was strung around fixed pulleys at both terminal ends of the track system and also supported throughout length of the track system at below grade elevation via a plurality of rollers spaced at regular intervals. At least one of the terminal pulleys was motor-driven to effect propulsion of the cable. Propulsion of the carriage was effected by a linkage member extending vertically from bottom of the carriage to the below-grade cable. Hallidie's track design provided a continuous slot passageway oriented longitudinally down the center-line of the track system. Said slot-way permitted lateral passage of said vertical linkage member from the carriage to the moving cable, with said linkage causing the carriage to move along the railway under influence of the moving cable.

An ideal aerial trolley system would include a 'lighter-than-air', helium-filled balloon craft with a suspended cargo carriage that is secured to, and guided along, a continuous elevated track system capable of passing over obstacles. An ideal aerial trolley system would include a track system that includes elements which impart stability to the balloon-craft's carriage against sideways tilting or rocking motion as said balloon-craft traverses across the continuous track system.

An ideal aerial trolley system would include an elevated track system capable of making gradual inclines, declines, and/or gradual turns so as to be accommodative of moderate terrain changes and to allow flexible routing.

An ideal aerial trolley system would also include a track designed to withstand substantial lateral and/or twisting stresses imparted upon it by the overhead balloon-craft on occasions where said balloon-craft is operated in the presence of strong lateral cross-winds. Likewise, the carriage of the balloon-craft in an ideal aerial trolley system would also have a sturdy frame so as to withstand high tensile and compressive stresses imparted upon it by the balloon and track.

Furthermore, an ideal aerial trolley system would include a more energy-efficient propulsion scheme. Finally, an ideal aerial trolley system would include a track system capable of safely supporting the full true weights of an idled balloon-craft and its cargo on rare occasions where the balloon may become deflated of its lifting gas.

SUMMARY OF THE INVENTION

The present invention relates to a novel and continuous aerial trolley system for the transport of passengers and/or other cargo across land or shallow water bodies in one or more carriage assemblies suspended from a 'lighter-than-air' balloon apparatus, and with said cargo carriage(s) being secured to, and guided by, and propelled along an elevated track system in a stable and energy-efficient manner. More specifically, the present invention relates to a special design of elevated track system, and also to a special design of cargo carriage assembly for any balloon-craft to be used on said track system, with both the carriage and the track system including elements that interact with each other so as to impart stability to the carriage against sideways tilting or rocking motion, especially when operating in presence of strong cross-winds. Furthermore, the present invention relates to propulsion of said balloon-craft along said track system by linkage of the balloon apparatus, and also each of it's carriages, to an externally-driven loop of steel cable arranged to run beneath, and longitudinally down the center-line of the elevated track system, thus eliminating the need for on-board propellers, motors, fuel, and crew.

The present invention also relates to the special design of linkage devices to attach the balloon-craft to both the track system and also to said drive-cable. Furthermore, the present invention relates to a special design of track masts to support and accommodate said cable conveyor system without obstructing the motion of said linkage members or any other moving parts. Finally, the present invention relates to a special design of track system so as to be capable of safely supporting the full true weights of any idled balloon-craft and its cargo on rare occasions where the balloon apparatus might become deflated of its lifting gas.

It is an object of the present invention to provide a continuous aerial trolley system to transport passengers and/or other cargo across appreciable distances of land or shallow water bodies in one or more carriages of a lighter-than-air balloon-craft.

It is another object of the present invention to provide an aerial trolley system with its balloon craft being capable of travel in both forward and rearward directions between two fixed terminal locations.

It is also an object of the present invention to provide a stable and continuous aerial trolley system which prevents tilting or rocking motion of the balloon-craft's carriage(s) as it travels along and above the track system, through its use and arrangement of parallel stabilizing tracks, and also through its use of carriage stabilizer arms that interact with said stabilizer tracks.

It is an object of the present invention to provide a continuous aerial trolley with an elevated track system which is capable of passage over objects and also capable of gradual inclines and declines in elevation, so as to accommodate terrain changes.

With the inclusion of one preferred embodiment, it is another object of the present invention to provide a continuous aerial trolley with a track system, which is also capable of making gradual (wide-radius) turns in the horizontal plane so as to allow flexible routing.

It is a further object of the present invention to provide an energy-efficient form of transportation through its use of a lighter-than-air balloon craft to render both said balloon craft and its cargo as virtually 'weightless' as experienced by the track system, thus reducing frictional resistance forces imparted by the track system upon the elements of the balloon-craft that interact with said track system.

It is a further object of the present invention to provide an energy-efficient form of transportation through its use of an aerodynamically shaped balloon and, aerodynamically shaped carriage to reduce air drag frictional resistance forces.

It is a further object of the present invention to provide an energy efficient form of transportation by propulsion of said balloon-craft across said track system via linkage of said balloon-craft to an externally-driven steel cable which is arranged to form an endless loop between two distant and fixed and motorized pulleys at both terminal ends of the aerial trolley system.

It is a further object of the present invention to provide a safe aerial trolley system which includes an emergency cradle rest apparatus to support a disabled balloon-carriage and its contents in any event where the balloon apparatus may become deflated of its lifting gas.

The foregoing has outlined some of the more pertinent objectives of the present invention. These objectives should be construed to be merely illustrative of some of the more prominent features and applications of the invention. Many other beneficial results can be attained by applying the disclosed invention in a different manner of modifying the invention as will be described.

It is to be understood that the foregoing general description and the following detailed description are exemplary and explanatory only and are not to be viewed as being restrictive of the present, as claimed. These and other objects, methods, features and advantages of the present invention will become apparent after a review of the following detailed description of the disclosed embodiments and the appended claims.

Further objects and advantages of this invention will be apparent from the following detailed description of a presently preferred embodiment which is illustrated schematically in the accompanying drawings.

DESCRIPTION OF THE DRAWINGS

FIG. 6 illustrates a front view of the carriage when at rest (solid lines), showing the slight elevation change from its position when in motion (dotted lines) and the slight opening of the carriage's side stabilizer arms to accommodate said elevation change according to the present invention.

FIG. 9 illustrates a front view of a balloon car and aerial trolley system with the alternative stabilizer track system consisting of two (2) parallel stabilizer 'cable-track' assemblies on both sides of the main center-line trolley guide track assembly, with each of said parallel stabilizer cable-tracks supported by a plurality of independent track masts at regularly spaced intervals, and also showing two (2) alternative carriage stabilizer 'cable-arms' extending, from both sides of the balloon car's carriage to each of said stabilizer cable-tracks where they are secured to said cable-tracks using the special cable-trolley assembly according to the present invention.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
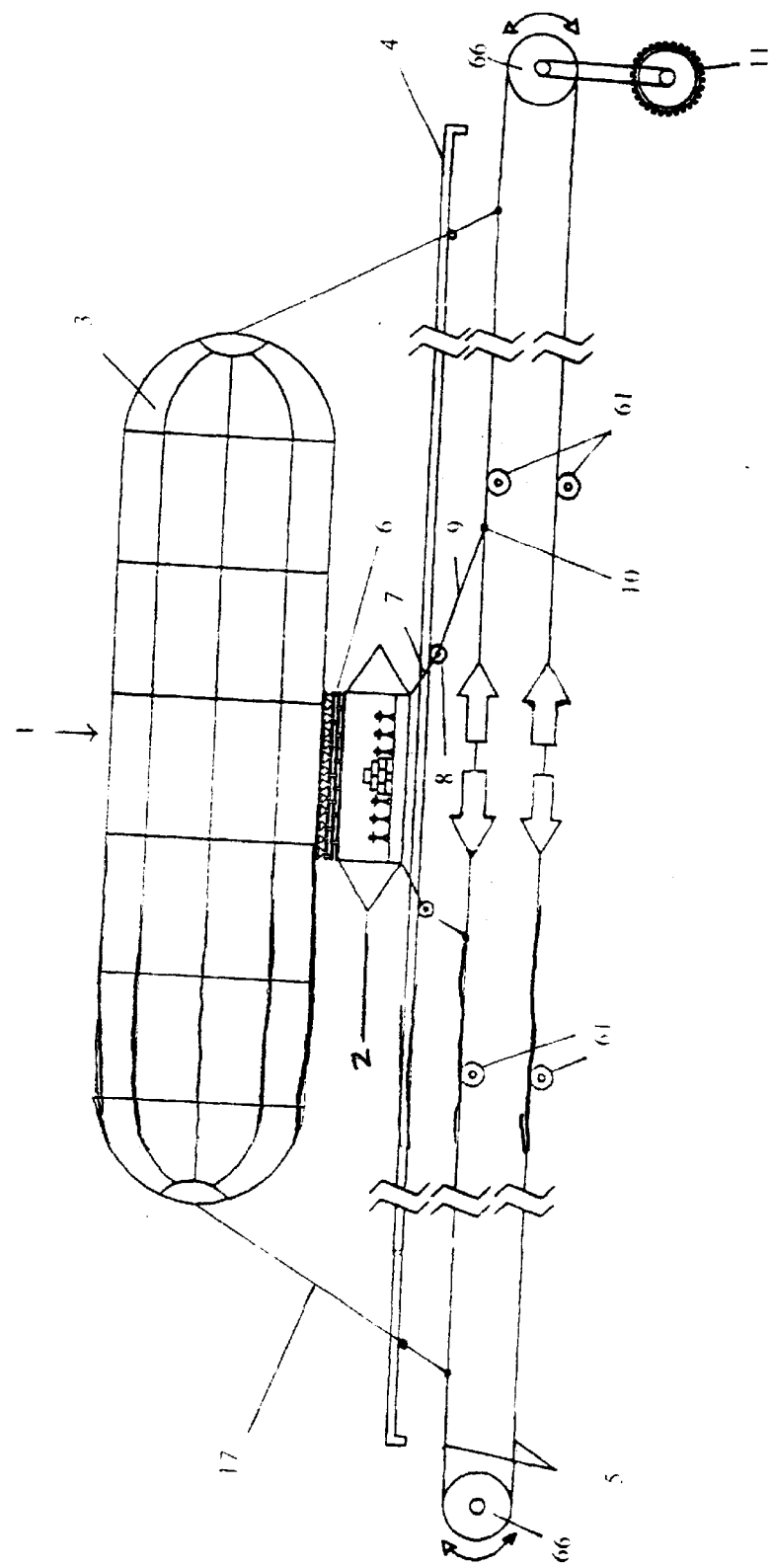
FIG. 1 illustrate simplified (concept only) side view of the aerial trolley system of the present invention, showing the balloon-carriage assembly, the trolley guide track, and the drive cable assembly, with the balloon car moving in both forward and reverse directions respectively.

As shown in FIG. 1, the present invention relates to a novel and continuous aerial trolley system including an elevated track system 4 and interacting balloon-car 1 for the transport of passengers and/or other cargo across land or shallow water bodies in one or more carriage assemblies 2 suspended from a 'lighter-than-air' balloon apparatus 3 of said balloon-car 1, and with said cargo carriage(s) 2 being secured to, and guided by, and propelled along said elevated track system 4 in a stable and energy-efficient manner. More specifically, the present invention relates to a special design of track system, and also to a special design of cargo carriage of any balloon-carriage to be used on said track system, with both the carriage(s) and track system including elements that interact with each other so as to impart stability to the carriage(s) against sideways tilting or rocking motion, especially when operating in presence of strong cross-winds.

Furthermore, the present invention relates to the propulsion of said balloon-car 1 along said track system by linkage of the balloon apparatus 3 and also linkage of each carriage 2 suspended there-from, to an externally powered and driven steel cable 5 (also shown as 5a and 5b) which is arranged to run beneath, and longitudinally down the center-line of the elevated track system, thus eliminating the need for any propellers, motors, fuel, or operating crew on-board the balloon or carriage(s).

The present invention also relates to the special design of linkage device 6 to attach said carriage(s) 2 to the balloon 3, and also special linkage devices 7, 8, 9, 10, 17 to attach both said balloon and also its carriage(s) to said drive-cable, with said linkage devices including a plurality of trolley wheel assemblies 8 which are secured to, and ride within, rigid channel elements 34 of the track system 4.

Figure 5:
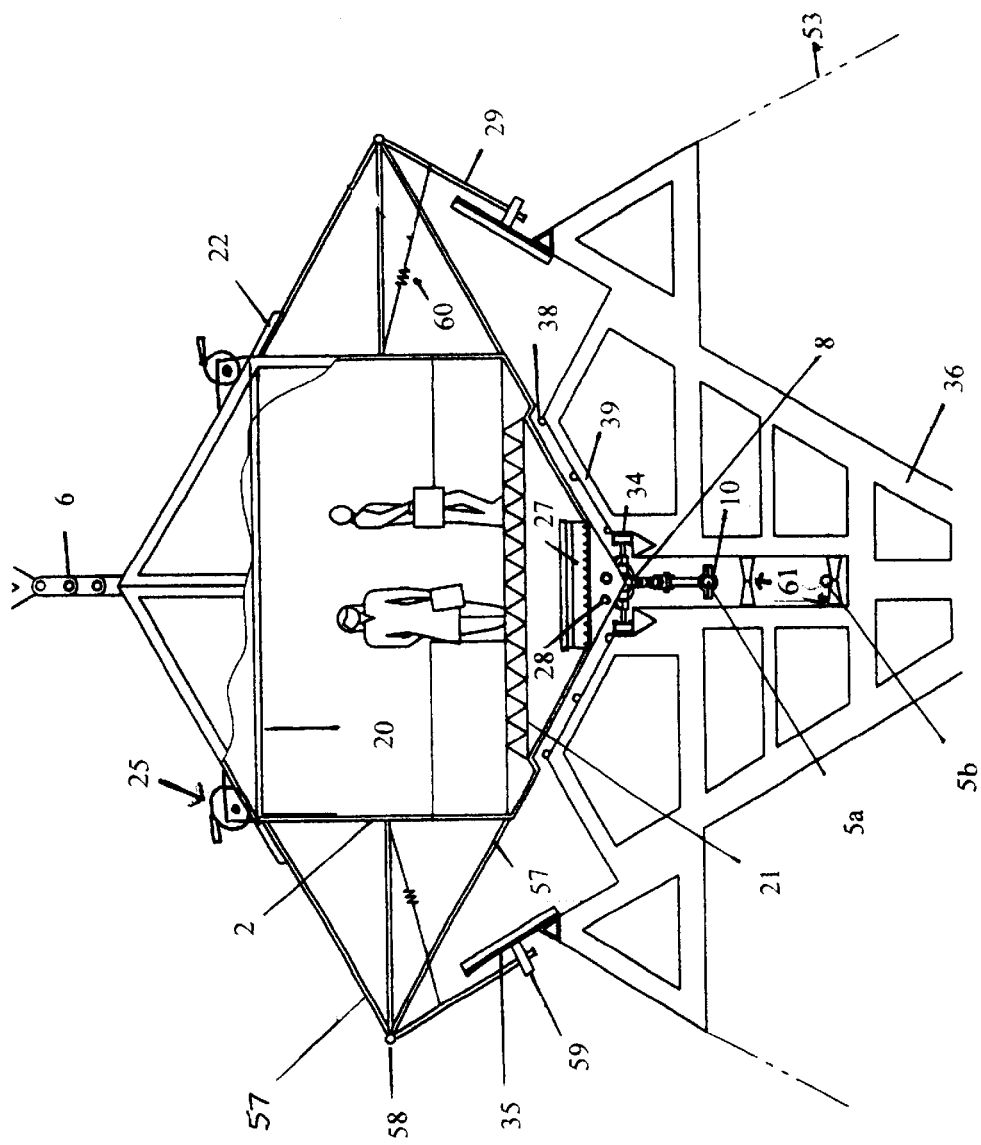
FIG. 5 illustrates a front view cross-section of the carriage of a small balloon car, showing the carriage's water ballast tank and floor components and its 'boat-hull' shaped bottom, and also showing the upper part of a track support mast with the central trolley guide track channels and drive cable support rollers, and also showing the two (2) side stabilizer track elements, and two (2) of the carriage's side stabilizer arms that interact with said stabilizer tracks, and finally, also showing the six (6) stationary cables that form the safety 'cradle rest' according to the present invention.

Furthermore, as shown in FIG. 5, the present invention also relates to the special design and shape of track masts 36 to support not only the track elements, but also to support and accommodate said cable conveyor 5 without obstructing the path of said linkage members or any other moving parts.

Furthermore, one optional embodiment of the present invention relates to special design of track system with an emergency cradle-rest 38 (shown in FIG. 5) that is capable of supporting the full true weights of any idled balloon-craft and its cargo upon rare occasions where the balloon might become deflated of its helium lifting gas.

The aerial trolley system of the present invention also enables networking of multiple said systems to enable transport to other and/or more distant destination terminals.

Figure 11:
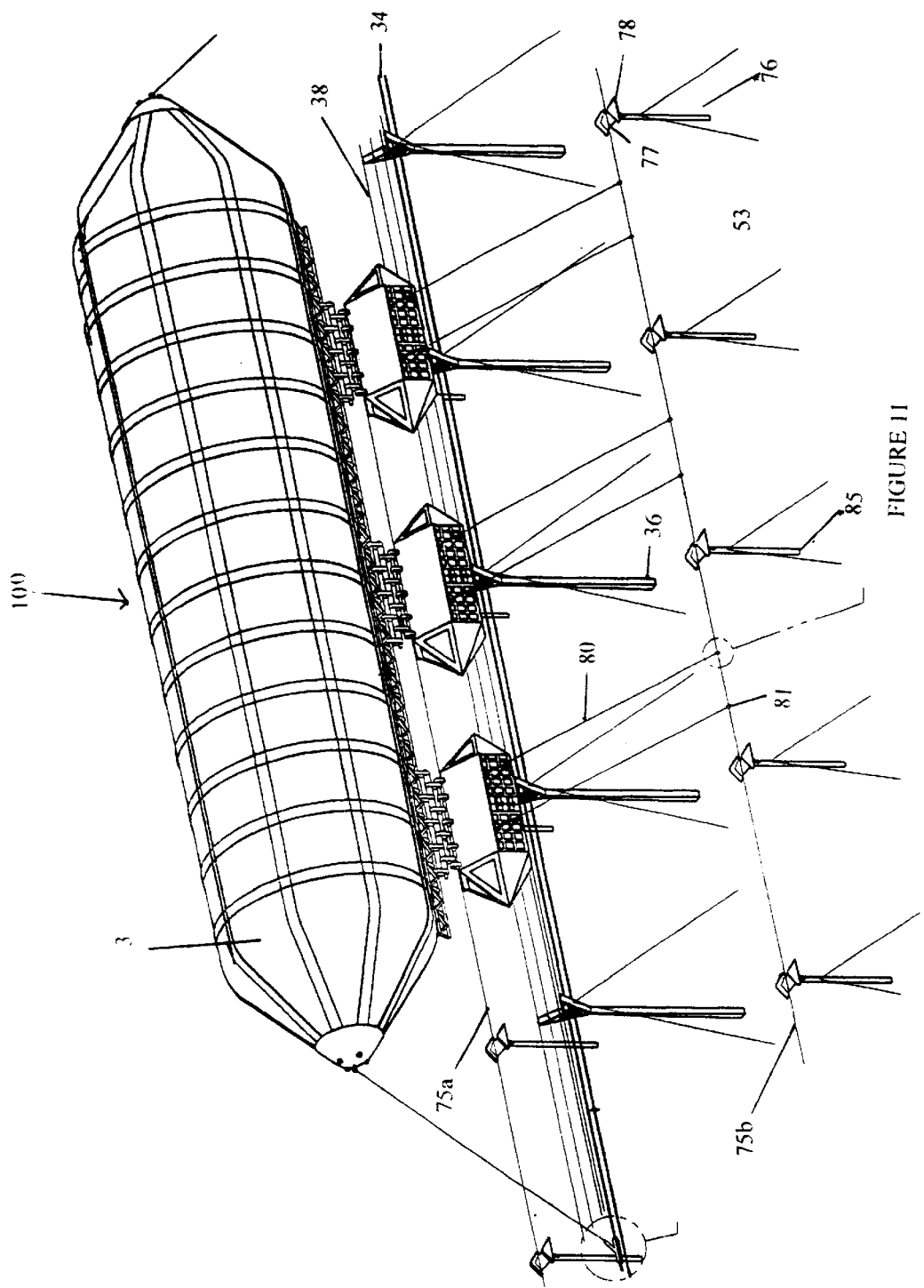
FIG. 11 illustrates a perspective side view of a large balloon train with multiple large carriages attached to the same large balloon apparatus, with said balloon train traversing the aerial trolley as modified with alternate stabilizer cable-tracks according to the present invention.

Finally, one optional embodiment of the present invention relates to a modified track system with an alternate version of stabilizing track elements, which may offer the advantage of reduced track construction costs, but which is limited to straight-line travel only (shown in FIG. 11).

Balloon-Car

Figure 2:
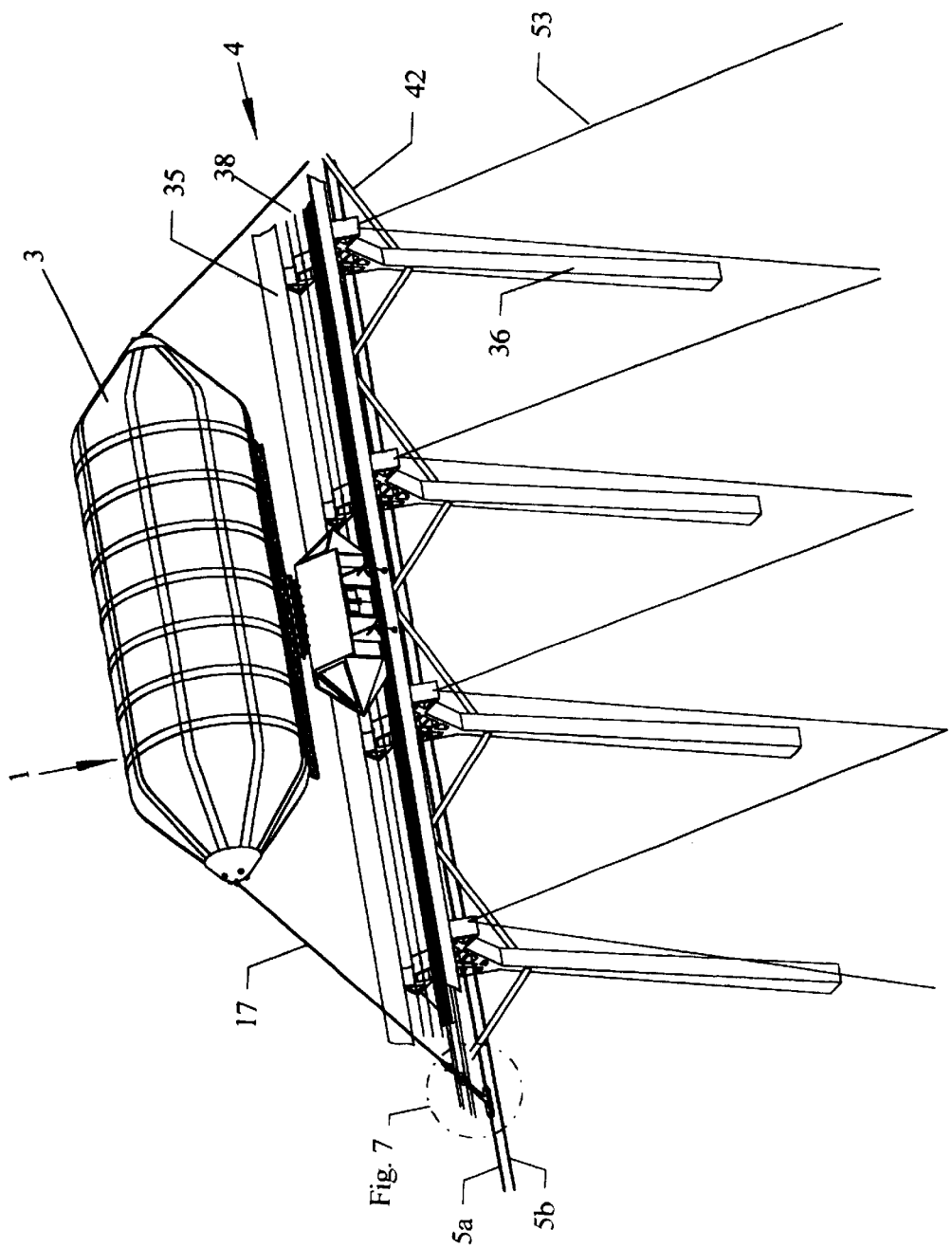
FIG. 2 illustrates a perspective view of a balloon car and aerial trolley system according to the present invention, showing a segment of the elevated track system with regularly spaced track support masts, and also showing the supply and return strands of the drive cable loop, and also showing the front and rear 'nose-wire' cables extending from both ends of the balloon apparatus to the top driven strand of drive cable.

FIGS. 1 and 2 illustrate a lighter-than-air balloon-craft (carriage) 1 for use on the elevated track system 4 of the aerial trolley of the present invention, for the transport of passengers and/or other cargo back and forth between two fixed and remote terminal stations. The preferred balloon craft includes an aerodynamically shaped balloon apparatus 3 which is filled with helium gas, and also an aerodynamically shaped carriage apparatus 2 which is suspended from, and attached to, said balloon apparatus for the containment and transport of passengers and/or other cargo. The combined balloon and carriage assembly, with the carriage including preferred special design elements of the present invention to be described later, shall heretofore be referenced as a 'Balloon-Car' 1. Furthermore, as shown in FIG. 11, multiple carriages of identical design may be attached to the same balloon 3 so as to form a 'Balloon-Train' 100.

Alternate balloon-craft for use on the aerial trolley track system of the present invention may optionally include on-board systems for self-propulsion, such as motor driven propellers typical of airships (not shown), provided that said alternate balloon craft do include the specially designed carriage 2 of the present invention. However, an onboard system for self-propulsion of said balloon craft is not necessary for the intended purposes of the present invention, nor is there any apparent advantage for doing so.

Balloon Apparatus

Figure 3:
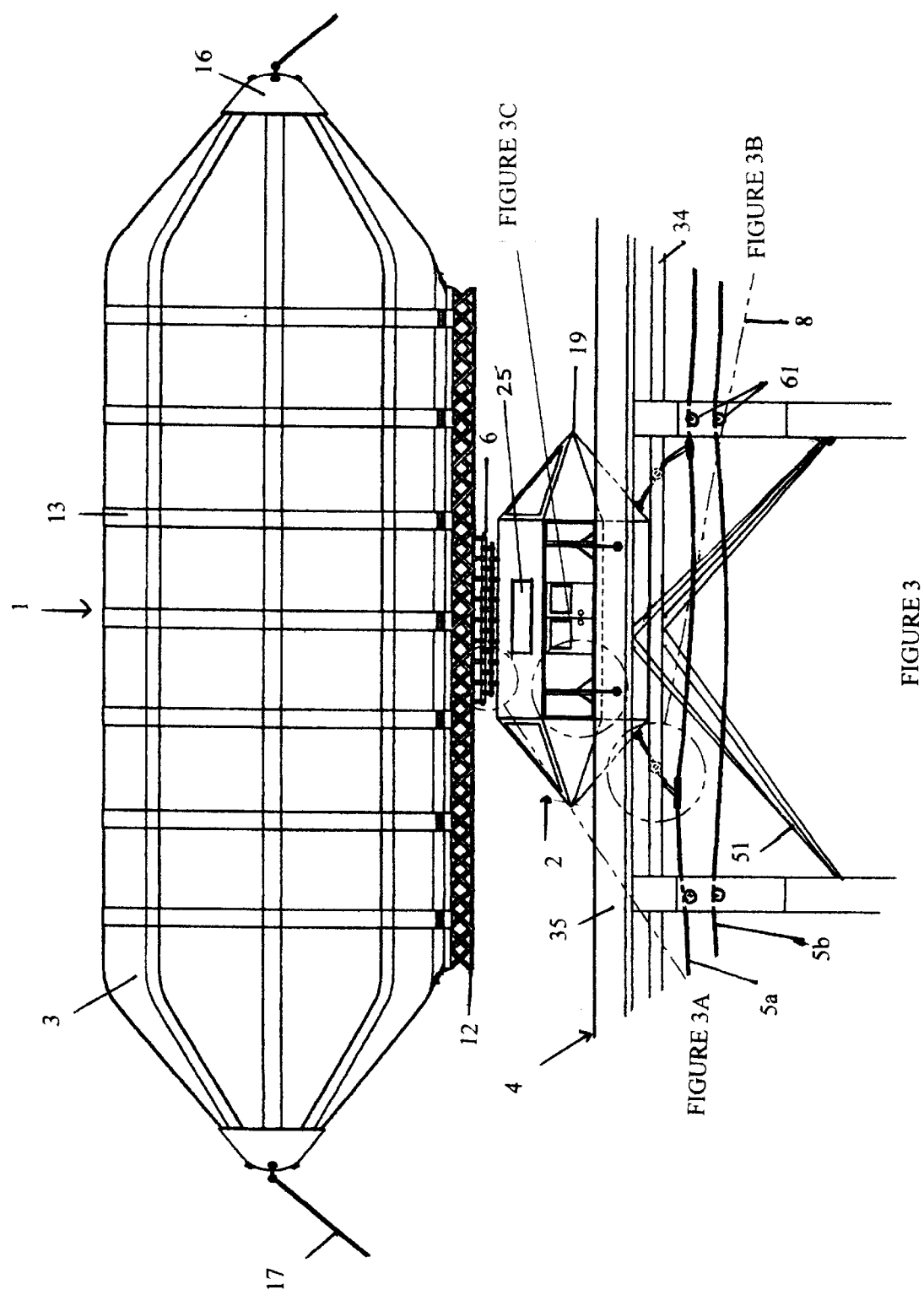
FIG. 3 illustrates a side view of a balloon car and segment of the track system showing the connection of the balloon to the carriage and the connection of the carriage to the main propulsion cable according to the present invention.

The balloon apparatus 3 provides buoyant lift proportionate to volume of the balloon due to the density difference between the helium gas contained within the balloon and the surrounding air (shown in FIG. 3). This buoyant lift is used to counteract gravity so as to make the entire balloon-car 1 (i.e. balloon 3+carriage 2+cargo) nearly 'weightless' as experienced by the track system 4. This quality of apparent weightlessness reduces the frictional resistance imparted by the trolley guide track 34 of the track system 4 upon the carriage's trolley guide wheels 44(shown in FIGS. 3, 3B, and 3C), thus reducing the force and energy required to propel the balloon-carriage assembly along said tracks. This 'lighter-than-air' quality (along with the special track design of the current invention) also allows the entire balloon-car assembly to be transported over objects and obstacles, and even over the track system itself, which enables significant advantages of flexible routing options and also lower construction costs.

The balloon apparatus 3 may be of any variety of possible designs typical of modem airship construction, and the specific design of said balloon apparatus is not especially relevant to the present invention, except for the yet to be described 'nose-wire' connecting cables 17 that are extended from both ends of the balloon, and also except for the 'connector-hinge' device 6 that is preferably used to connect the carriage(s) to the balloon. These latter two linkage items shall indeed be preferred embodiments of the present invention. Nevertheless, a preferred design of balloon apparatus, as described below for example only, is similar in construction to the balloon portion of a 'semi-rigid' airship, and includes three primary elements; an aerodynamically shaped balloon envelope 3 to contain helium gas, a limited external structural frame 12 at the balloon's bottom to distribute forces of the suspended load (carriage) attached thereto, and also a balloon 'harness' apparatus 13 to surround and contain the balloon envelope and also to secure said frame to the balloon envelope (shown in FIGS. 3 and 6).

Balloon Envelope

Although the balloon envelope 3 can be dimensioned to any size necessary and configured into any shape that is aerodynamically efficient, the balloon in the present invention is preferably, but not limited to, a cigar-shape, which is cylindrical in shape with truncated ellipsoid ends. The balloon envelope shall be constructed of modern lightweight, but durable, polymeric film materials that are applied in laminated layers so as to minimize gas permeability for efficient containment of the helium lifting gas. It is also preferred that the balloon envelope be of cellular type construction (not shown), where the balloon envelope is internally sub-divided into multiple independent gas cells, so that in case of balloon puncture, only one gas cell may be affected, and majority of other balloon cells may remain filled with lifting gas. The balloon shall be sized to provide surplus lift to accommodate the combined weights of its envelope 3, the bottom frame 12, the balloon harness 13, plus the carriage(s) 2 and also the objects and cargo housed therein, and yet still provide extra remaining net lift.

Balloon Frame

Figure 4:
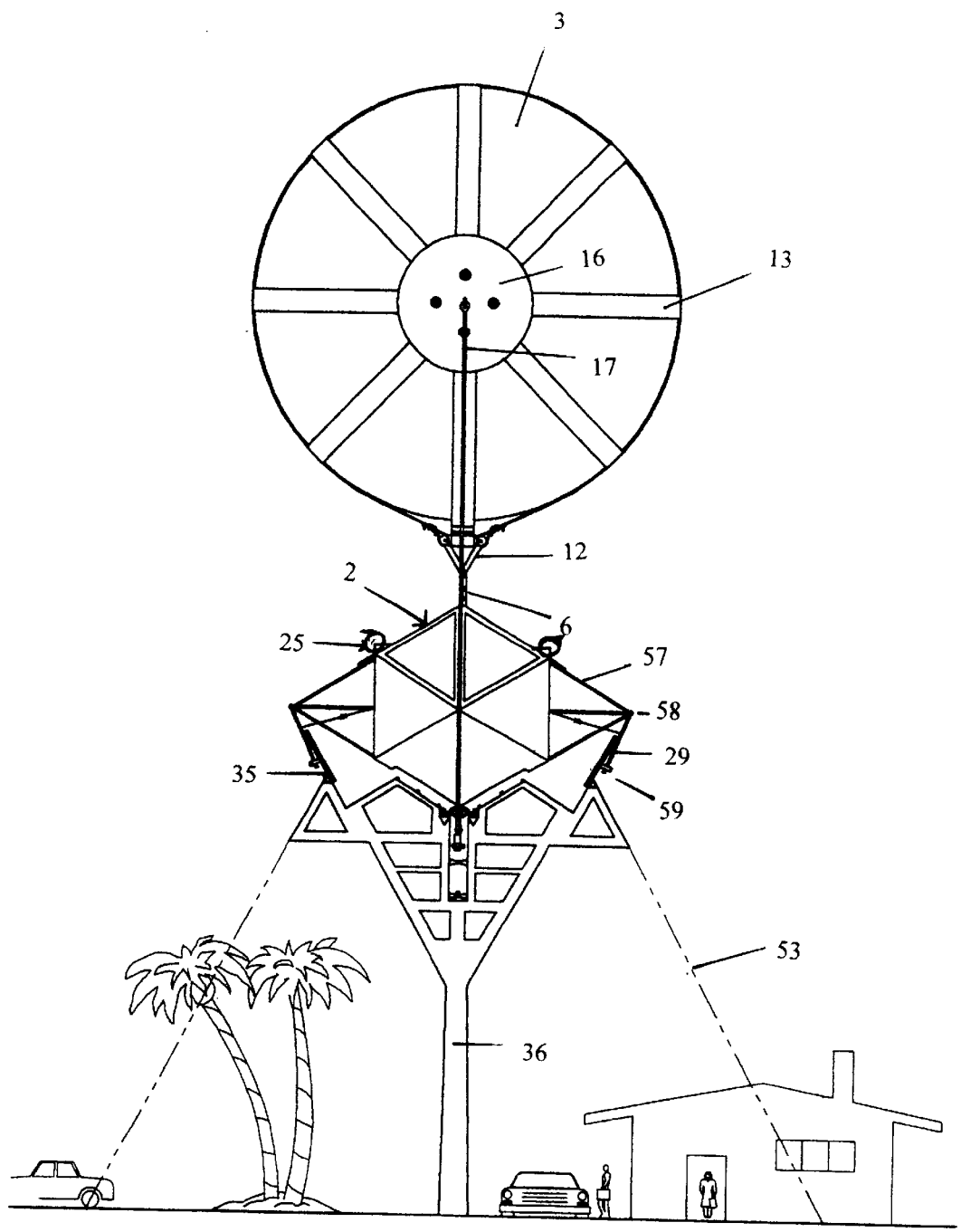
FIG. 4 illustrates a front view of the balloon car and track system according to the present invention.

The balloon apparatus 3 shall preferably include a frame 12 constructed of strong, but light weight tubing (aluminum alloy) which is dimensioned and configured in the form of a large triangular truss and positioned beneath the balloon envelope 3, and oriented to run longitudinally down balloon's centerline, with the apex of the tri-truss frame pointing downward (as shown in FIG. 4 and FIG. 6).

Balloon Harness

A balloon harness 13 would be draped over the balloon envelope 3 and used to contain the balloon and secure it to the balloon frame 12. Said harness would preferably be constructed of a network of long parallel straps, at regularly spaced intervals in both the longitudinal and lateral directions, which are preferably interwoven to form a cylindrical cage-like grid. Ends of the longitudinal straps (lengthwise down the balloon) would be connected to brassiere-like structures, referred to here as 'Bra Caps' 16 which are placed over the ends of the balloon 3. The straps would be secured to these bra caps and to each other as well via stitching or other suitable means. The straps shall preferably be made of a strong, light-weight, and weather resistant polymer fabric (i.e. Nylon, Kevlar).

The lateral straps would typically wrap around the girth of the balloon envelope 3 to tangential points at bottom of the envelope on both sides where the balloon's external frame 12 abuts next to the envelope. Furthermore, the vertically oriented ends of these lateral straps, would preferably be secured to the top side rails of the balloon frame 12 using buckle-like clamps 18 or any other comparable clamp known in the art, after snugging the frame up to the balloon envelope 3. Strap ends are preferably grommeted holed. Similarly, the longitudinal straps extending from the bottom sides of the bra caps at both ends of the balloon are also connected to the top end-rails of the balloon hanger frame 12 in a similar fashion.

Carriage Apparatus

The balloon-car 1 of the present invention includes as a preferred embodiment at least one carriage 2 having a frame which is constructed of sturdy, but lightweight materials (steel and aluminum tubing), and also a frame of a preferred shape as viewed in cross-section from front of the carriage. The most preferred shape for the carriage frame 2 is hexagonal in cross-section, having an apex at both the top and bottom of the frame for respective connections to the balloon 3 and track 4 of the present invention. The carriage frame and external hull is in the shape of an elongated hexagonal tube, with both ends (front and rear of carriage) brought to a tapered point via frame elements arranged so as to form pyramid shaped cones 19. This hull shape is preferred not only for said connections to the balloon and track, but also for aerodynamic reasons. The preferred hexagonal shape with pointed ends is streamlined in profile so as to minimize air-drag frictional resistance. Furthermore, the hexagonal cross-section is also symmetrical so as to not induce any net upward or downward lift forces as the carriage moves through the air as it traverses the track system.

As shown in FIG. 5, the carriage frame 2 shall include sturdy horizontal cross-brace members 20 so as to withstand tensile and compressive forces exerted upon the carriage frame by lifting force of the balloon. Said sturdy cross-braces shall also support one or more floor structures 21 within the carriage for holding of its contents. The carriage 2 would also include a sloped roof 22 with eaves for rain diversion. The outer hull of the carriage shall preferably be made of lightweight, but durable, and weather-resistant polymer composite materials, and shall include doors and windows. In a preferred embodiment, the carriage shall also include at least one retractable rain canopy 25 affixed to at least one side of the carriage 3 and located over at least one doorway. Said retractable canopy shall preferably be of a roll-out canister type (as shown), or alternately could be of any fold-down type (not shown).

Furthermore, the carriage may be furnished with seating, lighting, HVAC, and/or other amenities consistent with intended cargo to be transported. A variety of options exist for providing electrical power supply to the carriage for operation of on-board lighting, amenities, and instrumentation systems. The usage of DC battery packs and/or portable gasoline-powered generator (not shown) will be assumed here for simplicity. Other options might include generators attached to the trolley-wheel axles, photo-voltaic solar cells mounted on top of balloon, or even usage of select track members to conduct electricity to and from the carriage from a remote supply source. Nevertheless, said power supply to the carriage is only of secondary importance to the current invention. The list of these features are in no way exhaustive, and one skilled in the art could incorporate many features that are both necessary or not into the present invention. The most preferred use for the carriage is to accommodate the aerial transport of various objects, preferably, but not limited to cargo, passengers, and animals.

For maximum stability and safety, when multiple carriages 2 are attached to a common balloon 3 so as to form a Balloon Train 100 (shown in FIG. 11), each of said carriages 2 would preferably be of approximately the same weight, size, and capacity, and they shall be equally spaced along the balloon's length so as to conserve overall center of gravity of the Balloon Train 100.

Keel

Figure 6B:
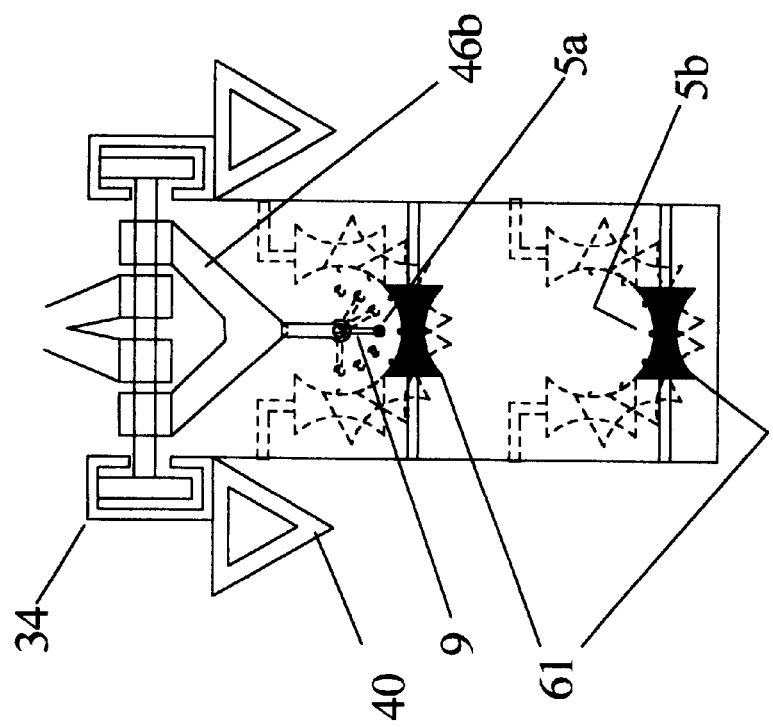
FIG. 6B illustrates an enlarged front view of the central trolley guide track channels and of the drive cable support rollers below, showing how said rollers can be oriented at different angles to support said cable through turns of the track system.
Figure 6A:
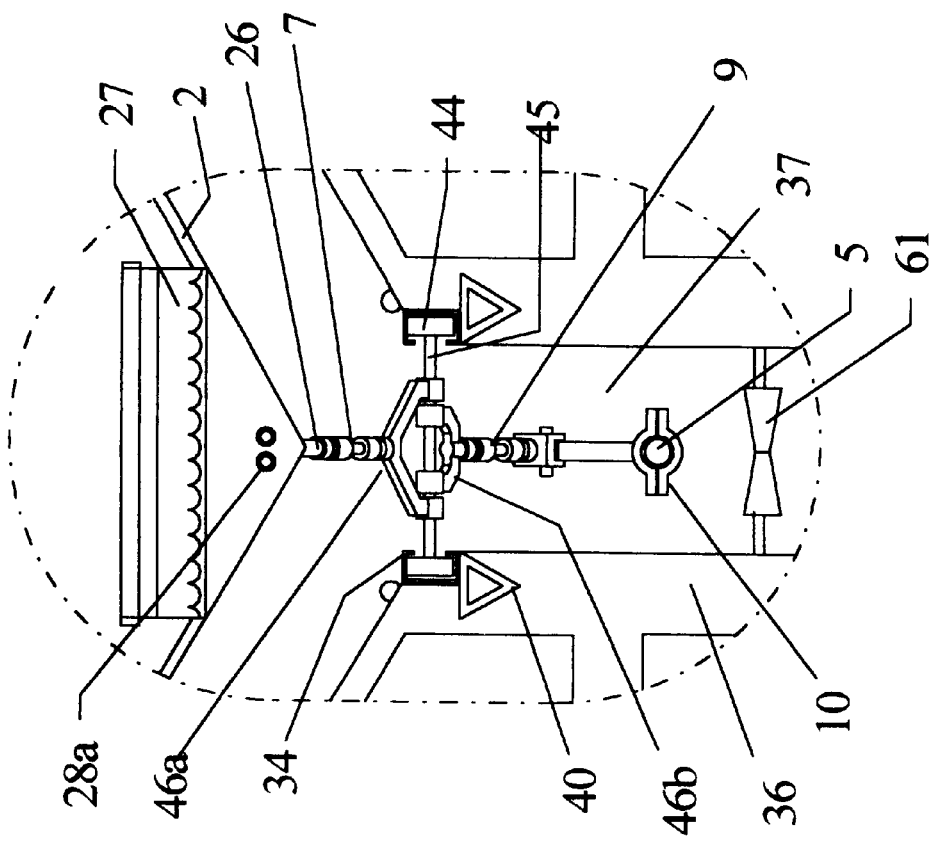
FIG. 6A illustrates an enlarged front view of the central trolley guide track channels with interacting trolley guide wheel assembly and linkage members from the carriage's bottom keel to the axle of the trolley wheel assembly and also the linkage members from same axle to the drive cable below.

In a preferred embodiment of the present invention, the bottom of the carriage will also be fitted with an external keel 26 that protrudes downward from the bottom apex of carriage's hull and runs longitudinally down the full length of the carriage 2 (shown in FIG. 6A). The purpose of this keel is twofold. The keel 26 not only serves for connection of the carriage to the trolley guide wheel assemblies 8 of the track system 4, but it also serves to position the carriage at proper elevation with respect to the track as the carriage is propelled along the track.

Ballast Tank

In another preferred embodiment, the carriage shall also include and contain a water ballast tank 27 which shall be filled with variable amounts of water to compensate for changes in cargo load, so as to maintain optimum net lift of the combined balloon-car 1 as experienced by the track 4 and trolley guide wheels 8. The ballast tank 27 is positioned inside the carriage at its bottom and runs longitudinally down its center, throughout full length of the carriage 2. Said ballast tank preferably has a triangular shaped bottom so as to conform to shape of the carriage's hull. The ballast tank 27 includes vertical sides and end walls, and a top with air vent. This tank shall also include internal elements of multiple splash-baffle plates (not shown) to prevent the ballast water contained within from splashing and/or rushing from end-to-end (so as to avoid rapid and unstable changes in carriage's center of gravity). The water ballast tank 27 shall also include at least two (2) inlet and outlet nozzles 28 (also shown as 28a and 28b), which extend from at least one end of said ballast tank 27 and pass through the carriage hull to the outside. Furthermore, each of these inlet and outlet nozzles shall be fitted with valves (not shown) which may be either manually operated, or, automated with electric motor actuators. Furthermore, the terminal ends of said inlet 28a and outlet nozzles 28b shall also preferably include flanged ends for easy hose attachment. Ballast water shall be admitted to the ballast tank and/or drained from the ballast tank 27 through hoses (not shown) connected to these nozzles, but only when the balloon carriage is stopped and at rest at a terminal station of the track system, so as to compensate for changes in cargo load while at the terminal.

Stabilizer Arms

Finally, in a most preferred and important embodiment, the carriage 2 shall also include stabilizing elements that interact with counterpart stabilizing elements of the track system so as to keep the carriage upright and to stabilize the carriage against sideways tilting or rocking motions as it traverses the track, especially when operating in the presence of strong cross-winds. Preferably, four (4) stabilizer 'arm' assemblies 29 shall be affixed to the carriage frame and oriented to extend outward and downward and back inward from both sides of the carriage frame 2 at both its front and rear ends. The end of each carriage stabilizer arm 29 shall include a freely rotating wheel 59, which shall ride along the flat underside surface of one of two parallel stabilizer track elements 35 of the track system (shown in FIG. 3C). Each carriage stabilizer arm assembly shall also be tension-spring 60 loaded so as to grip onto its respective stabilizer track 35. The application of four of such stabilizer arms 29, in a symmetrical and balanced fashion from all four corners of each carriage 2, shall stabilize the carriage against undesirable sideways tilting or rocking motion. These stabilizer arms and their function are further explained later in more detail (see CARRIAGE-STABILIZER TRACK CONNECTION.)

Balloon-Carriage Connection

The most preferred orientation of the carriage 2 is co-linearly beneath the balloon frame 12, so as to position said carriage at the balloon & frame's center of gravity. Furthermore, as shown in FIGS. 4 and 5, the carriage 2 is preferably oriented such that the top of the carriage frame 2 and bottom of the balloon frame 12 form an apex-to-apex junction. Furthermore, as shown in FIGS. 3 and 3A, the carriage 2 is preferably connected to the balloon frame 12 via a special hinge joint 6 assembly. Said hinge joint 6 shall extend along full length of the carriage 2, and it shall be constructed of a long, continuous, and rigid hinge pin 30 made of steel rod or pipe, and also rectangular shaped steel hinge plates 31, 32 which are secured onto said hinge pin 30 in sleeve-like fashion, and with said hinge plates 31, 32 separated by spacer bushings 33, and with the sleeved rectangular hinge plates 31, 32 extending upward and downward, respectively, from the hinge pin 30 in alternating sequence. The upward extended hinge plates 31 shall be securely fastened to the bottom rail at bottom apex of the balloon frame's 12 downward pointing truss. Similarly, the downward extended hinge plates 32 are securely fastened to the top longitudinal rail at top apex of the carriage frame 2.

The carriage 2 could alternately be affixed directly and rigidly to the balloon frame 3 without the need for a hinge joint assembly 6. Nevertheless, the hinge joint scheme of the present invention is preferred because, with regard to the respective frames of both the balloon and carriage said hinge joint shall distribute forces better and reduce bending moments on key structural frame members, especially when in presence of strong cross-winds. More specifically, the hinge joint 6 will allow the balloon 3 to tilt to one side at a small angle from vertical when in the presence of strong cross winds. Finally, the hinge 6 shall also simplify carriage 2 removal and replacement for maintenance, etc.

Track System

The track system 4 of the present invention shall preferably be elevated above grade to any height as necessary to pass over the tallest of objects or obstacles in the track's projected path (i.e. power-lines, roadway overpasses, bridges, trees, buildings, hills, etc). The track system of the present invention shall also be capable of gradual inclines and declines so as to be accommodative of changes in terrain. Furthermore, through one special embodiment, the track system of the present invention shall also be capable of making gradual wide-radius turns, so as to allow flexible routing.

Figure 3B:
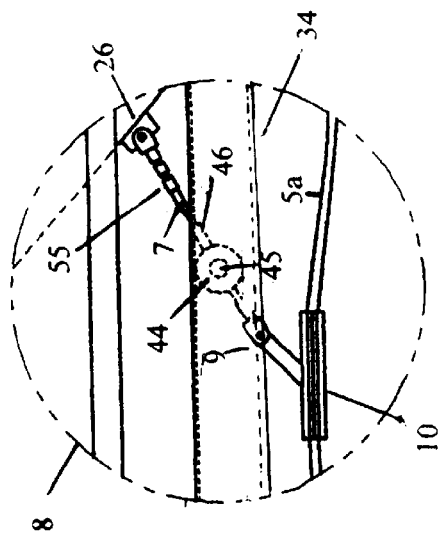
FIGS. 3A and 3B show enlarged views of connection portions of FIG. 3.
Figure 3C:
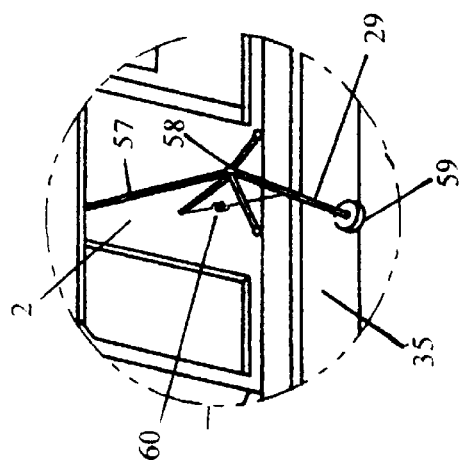
FIG. 3C shows a perspective view of one carriage stabilizer arm assembly with its freely rotating wheel interacting with one of the two stabilizer track elements of the track system.
Figure 3A:
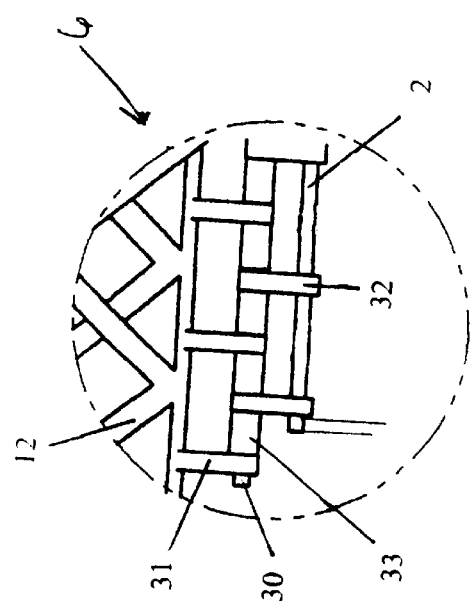

As shown in FIGS. 3, 3B, and 3C, the track system 4 of the present invention preferably includes two primary linear track sub-systems 34, 35 which are arranged to run in parallel with each other and longitudinally down the track system, but at different elevations relative to each other. One of said track sub-systems is a pair of rigid channel-type elements that form the main trolley guide track assembly 34 which runs longitudinally down the centerline of the track system. The other primary track sub-system is a pair of rigid plate-type elements that form the stabilizer track assembly 35. Said stabilizer tracks 35 are arranged in parallel to, but at slightly higher elevation than, the main trolley-guide track assembly 34 and they are spaced farther apart from each such that, when viewed down track centerline, the two individual stabilizer track elements 35 and the main trolley guide track assembly 34 (considered as a single entity) form the profile of an inverted triangle (shown in FIG. 5). This 'triangulated' profile of three parallel track elements is preferred so as to impart stability to the balloon-car's carriage against undesirable sideways tilting or rocking motions as the balloon-car traverses across top of the track system, especially when operating in the presence of strong cross-winds. Said two parallel stabilizer tracks shall preferably be arranged at a slightly higher elevation than the main trolley guide track. However, the embodiments of the current invention shall also include an alternative stabilizer track arrangement where the two parallel stabilizer track systems may be arranged at a lower elevation than the main trolley guide track. This alternative stabilizer track system shall be further discussed later as a separate embodiment (see ALTERNATIVE STABILIZER TRACKS).

The track system 4 of the present invention also preferably includes a plurality of trolley guide-wheel assemblies 8 which each have two (2) freely rotating wheels 44 mounted at the ends of a short axle rod 45, where said two wheels are respectively secured by, and travel freely within, the two (2) rigid and parallel channel elements of the main centerline trolley guide track 34 sub-system. Furthermore, the axles of each of said trolley wheel assemblies 8 are each connected in both the upward direction to either the balloon 3 or carriage 2 above the track, and also connected in the downward direction to the drive cable 5 below the track, so as the render all of said components as flexibly co-linked to each other.

The elevated track system 4 of the present invention, including the above described primary linear track sub-systems 34, 35 shall be supported above ground by vertical masts or stanchions 36, which shall be spaced at regular intervals along length of the track system. The top sections of each of said vertical support masts 36 shall have a preferred "Y" shape profile and shall include a preferred open vertical trough area 37 provided at the bottom and center of each said "Y" section of each vertical track mast 36. Said open trough areas 37 shall accommodate and support both of the two moving strands of drive-cable 5 assembly. Furthermore, said vertical support masts 36 of the elevated track system of the present invention shall also accommodate and support a plurality of fixed and stationary, yet flexible, steel cables 38 which are strung longitudinally and in parallel from mast 36 to mast throughout length of the track system 4 and which are preferably arranged in a "V" shaped profile so as to form an emergency 'cradle rest' 38 which shall be capable of supporting the true combined gross weight of the balloon car 1 in any event where the balloon apparatus 3 might become deflated of its lifting gas. All of the above-mentioned elements of the track system 4 are preferred embodiments of the present invention and they are further explained and described below.

Trolley Guide Track

The primary trolley-guide track 34 of the present invention shall be constructed of two rigid and predominantly straight steel channels of "C" shaped profile 34, which are arranged in parallel with each other and extended continuously from mast 36 to mast throughout entire length of the track system 4 down its center-line. Furthermore, said steel "C" channels of the main trolley track 34 shall be separated from each other by a fixed small distance, and also arranged such that the concave sides and slotted openings of said "C" channel elements 34 face each other. These steel "C" channel tracks 34 shall actually be composed of a plurality of fixed length segments which are extended end-on-end between track masts. Said "C" channel track elements shall preferably be supported on their undersides by rigid and straight triangular steel trusses 40, which extend continuously and collinearly below each of the two channel elements of the main trolley guide tracks 34, and which are also preferably arranged such that the apex of each triangular truss 40 points in the downward direction. The two steel "C" channel track elements 34 shall preferably be laid along the flat top surfaces of their respective two triangular support trusses 40 in a co-linear fashion and fastened down via welding or some other means that is not obtrusive to any of the inner surfaces, or slotted side surfaces of said "C" channel elements of the main trolley guide 34 track system.

The above-described steel truss elements 40 shall in turn be laid across horizontal cross members of the track system support masts 36 in a perpendicular fashion, and fastened down. The horizontal cross members of the vertical track support masts 36 shall have brackets to accommodate the bottom apex ends of the inverted triangular trusses 40. Said triangular trusses 40 shall also be supported at their mid-lengths between each vertical track mast 36 by a plurality of angle braces 42 extended from the mid-sections of both adjacent masts 36. In addition, other secondary cross-members are extended between these angle braces 42 for extra stability.

The continuous trolley guide tracks 34 shall be capable of extending continuously through gradual inclines or declines in the vertical plane via slight vertical angle adjustments between consecutive straight segments of each channel at their points of junction at each track mast, and/or via usage of channel segments which are specially designed to themselves have slight curvature in the vertical plane.

Similarly, the trolley guide tracks 34 shall be capable of extending continuously through gradual curves in the horizontal plane via slight horizontal angle adjustments between consecutive straight segments of each channel at their points of junction at each track mast, and/or via usage of channel segments which are specially designed to themselves have slight curvature in the horizontal plane.

Trolley Guide Wheels

The track system 4 of the present invention includes a plurality of specially designed trolley wheel assemblies 8, which ride inside the parallel "C" channels of the main trolley guide track 34. The balloon car 1 or balloon train 100 of the present invention is indirectly secured to the main trolley guide track 34 by linkage of the balloon 3 to two (2) of these secured trolley wheel assemblies 8, and also by linkage of each carriage 2 to two (2) additional trolley wheel assemblies 8, as will be further explained later.

As shown in FIGS. 3B and 6A, each trolley wheel assembly 8 shall include a pair (2) of small wheels 44 connected to each other by a short common axle 45. Said wheels may be constructed of any hard and durable material, preferably a material with smooth surface and low friction qualities. Said wheels shall also be provided with bearing assemblies (not shown) so as to enable them to rotate freely about their mutual axle.

Figure 7:
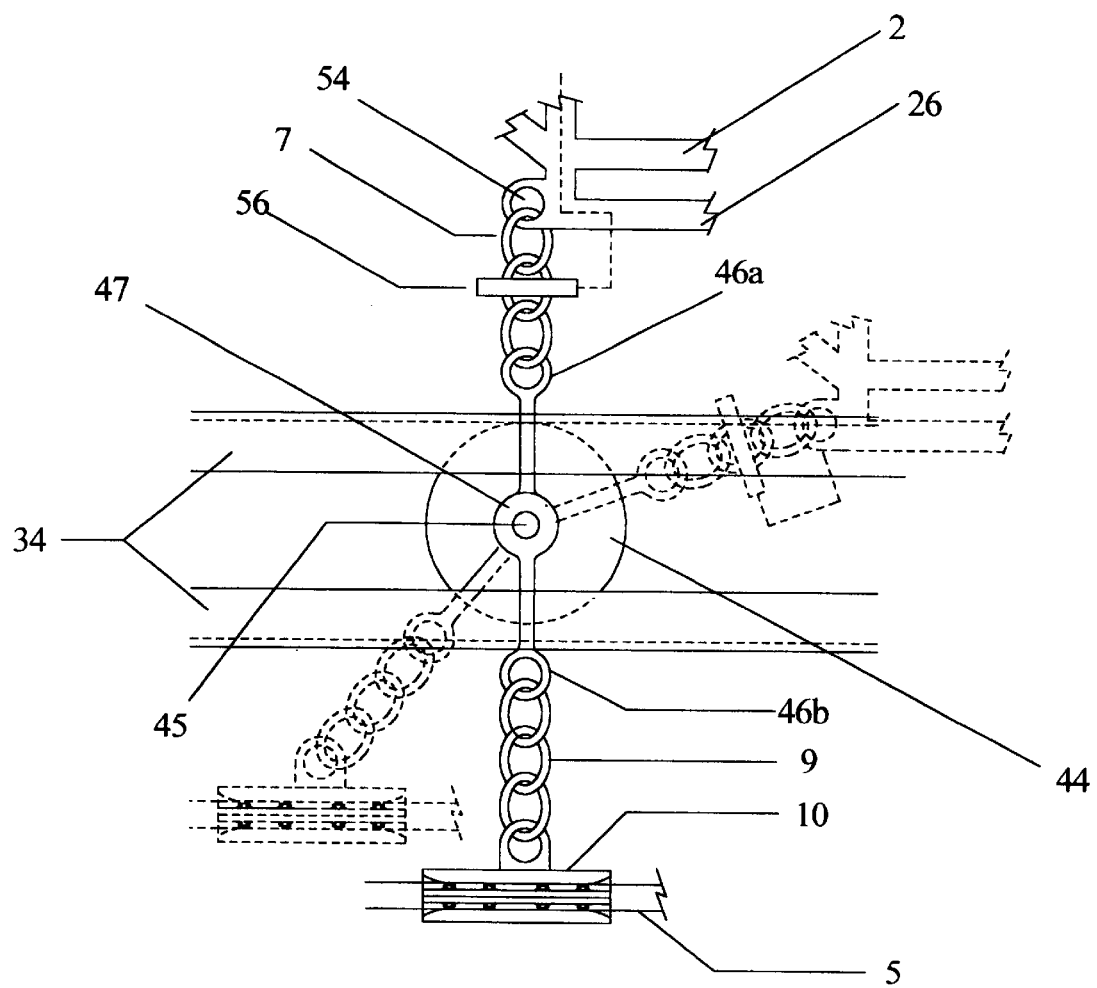
FIG. 7 illustrates a detailed side view of the linkage members from carriage bottom keel to the trolley guide wheel axle and also linkage members from said axle to the drive cable, including the special cable tee clamp, and said linkage members are also utilized between the nose balloon nose-wires and the drive cable according to the present invention.

The two wheels 44 of each trolley wheel assembly 8 ride in the two parallel "C" shaped channels of the main center-line trolley guide track 34. The axle 45 that connects the two trolley wheels 44 shall pass laterally through the slotted openings of each opposing "C" shaped channel of the trolley guide track 34. As shown in FIG. 7, the outer diameter of the trolley wheels 44 shall be slightly larger than the height of the slotted openings on the side of each "C" shaped channel 34, so as to securely confine the trolley wheels 44 inside each of their respective track channels 34. However, the outer diameter of said trolley wheels 44 shall be slightly smaller than the total inside vertical height of said "C" channel tracks 34 so that the wheels can ride along the top inside surfaces of said channels 34 and rotate freely, without touching the bottom inside surfaces of the channels. Furthermore, said trolley wheels 44 can freely travel in their respective track channels 34 in either forward or reverse directions.

Each trolley wheel assembly 8 shall also include two diametrically opposed yoke assemblies 46 (also shown as 46a and 46b) which are attached perpendicularly to each axle 45, so as to allow the simultaneous and independent attachment of each trolley wheel assembly 8 to not only its associated balloon or carriage component positioned above the track 34, but also independent attachment of said trolley wheel axle 45 to the drive cable 5 apparatus below the track 34, via linkage to the ends of both of said yoke assemblies 46. As shown in FIG. 6A and FIG. 7, "Y" shaped yoke assemblies 46 shall be attached to the trolley wheel axles 45 in a perpendicular orientation, with said attachment being preferably made via sleeved connectors 47 around each axle 45, so as to allow both of said yokes 46 to rotate freely and independently about said wheel axle. Alternately, said yokes could be rigidly attached to the wheel axles, at 180° angle orientation from each other, because the trolley wheels shall include bearing assemblies to allow their free rotation about a fixed axle.

Both of said axle yokes 46 shall preferably have a "Y" shaped profile whereby they each converge from their dual sleeved-connector ends 47 at each axle 45 to a single rigid rod element at the other end of each yoke. Furthermore, these single rod-like end elements at the end of each axle yoke assembly 46 shall preferably be provided with large eye-rings (or equivalent) to allow flexible attachment to other linkage elements.

Stabilizer Tracks

The two (2) stabilizer tracks 35 of the present invention shall be rigid and predominantly straight channel elements extended end-on-end between track masts 36 so as to form two continuous and parallel channel tracks 35 throughout length of the track system 4. These stabilizer track channels 35 shall preferably be constructed of sturdy and rigid material, preferably steel plate (or equivalent), for strength to resist bending under occasional high loads exerted on them by the multiple carriage stabilizer arms 29 when the balloon car 1 or balloon train 100 is under the influence of strong cross-winds. Each of these track channels 35 shall preferably have a flat and smooth surface on at least one side, and they shall be arranged longitudinally, and in parallel with the main center-line track, but they shall be positioned above and laterally outward from the main centerline track, with their flat faces oriented so as to point downward at approximately 45° angle outward and upward from the track centerline 34 so as to form a "V" shaped profile. The flat and smooth underside surfaces of these stabilizer track channels 35 shall accommodate the freely rotating idler wheels 59 that shall be attached to fixed axles 29 at the ends of each of the carriage stabilizer arms 29 that are extended outward from both sides of each carriage 2 (shown in FIGS. 3B, 3C, 4, and 5).

Figure 8:
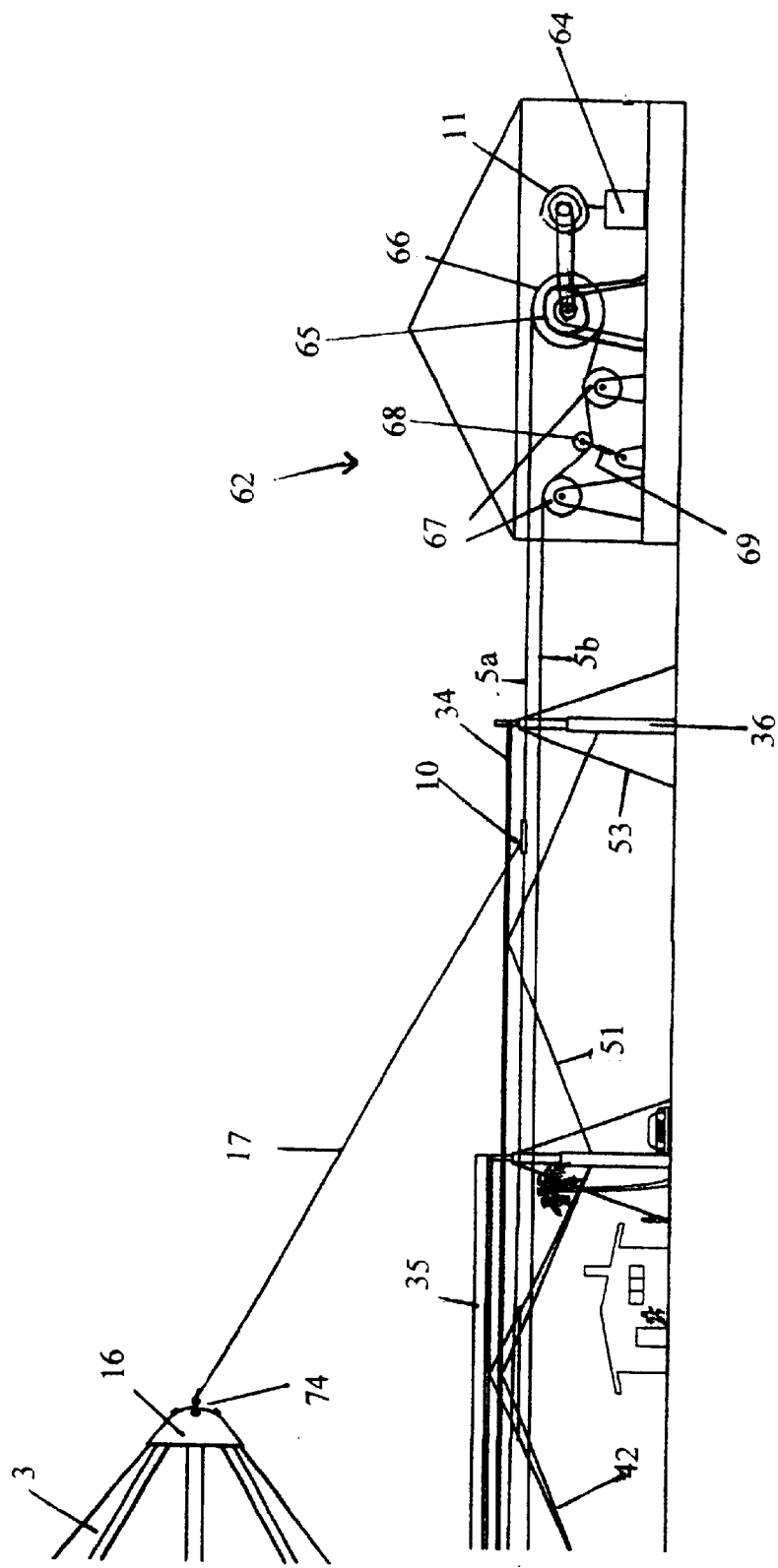
FIG. 8 illustrates a side view of one terminal end of the aerial trolley's track system, with relative position of one balloon end with its nose-wire cable, and also showing the cable drive system at the motor room, including the primary large driven cable pulley, the cable drive motor, gear box, and also showing the plurality of stationary and tensioning cable pulleys according to the present invention.

The above-described stabilizer tracks 35 shall preferably be attached to, and supported by, long rigid triangular steel trusses which are extended end-on-end between track masts 36 in a straight and collinear fashion throughout the full length of the track system 4, with the apex of each tri-truss pointing upward. The two steel stabilizer track elements 35 shall preferably be laid atop the upper and inward-sloped sides of these triangular trusses and fastened down. The flat bottom sides of the triangular truss elements shall in turn be laid across horizontal cross members of each vertical track mast 36 and fastened down. Said support trusses shall also be supported at their mid-lengths between each mast 36 by a plurality of angle braces 51 extended from both of its adjacent track masts 36 at mid height of each mast. In addition, other secondary cross-brace members shall be extended between said angle braces 51 for extra stability and support (shown in FIGS. 3 and 8).

The stabilizer tracks 35 shall be capable of extending continuously through gradual inclines or declines in the vertical plane via slight vertical angle adjustments between consecutive straight segments of each channel at their points of junction at each track mast, and/or via usage of channel segments which are specially designed to themselves have slight curvature in the vertical plane.

Similarly, the stabilizer tracks 35 shall be capable of extending continuously through gradual curves in the horizontal plane via slight horizontal angle adjustments between consecutive straight segments of each channel at their points of junction at each track mast, and/or via usage of channel segments which are specially designed to have slight curvature in the horizontal plane.

Cradle Rest

In another preferred option embodiment of the present invention, a plurality of at least six (6) stationary steel cables 38 are strung in parallel across horizontal the track masts 36 throughout the full length of the track system and affixed to bracket members 39 (shown in FIGS. 2 and 5) which are in turn affixed to unspecified horizontal cross members of said track masts 36. Said cable support brackets 39, and the plurality of stationary cables 38 affixed thereto shall both preferably be arranged into a "V" shaped profile (as viewed down track center), so as to conform to the shape of the bottom hull of the carriage 2, and said stationary cables 38 shall also preferably be positioned at an elevation just below that of the bottom of the carriage 2 when the carriage is in motion under normal operation. The purpose of said plurality of stationary cables 38 is to safely accommodate and cradle the bottom hull(s) of the carriage(s) in any emergency event whereby the balloon 3 might be damaged and deflated of its (helium) lifting gas. As such, the above-described plurality of stationary cables that are arranged into a "V" shaped profile will heretofore be referred to as the 'cradle rest' 38 of the present invention. It should be noted and understood that inclusion of the above described 'cradle rest' option does require that various elements 34, 35, 36 of the track system 4 of the present invention need to be of very robust construction, so as to enable said track system 4 support the entire weight of the balloon car or balloon train in the emergency event where the balloon becomes deflated of its lifting gas. However, in niche applications (i.e. cargo transport) where passenger safety is not of utmost importance, the 'cradle rest' 38 option may be forfeited, and the track system 4 can be made of much less robust construction to significantly reduce cost of the track system.

Track Masts

The track masts 36 shall be rigid vertical structures, which are firmly anchored in the ground. Said masts shall have at least one vertical ground post and a top section of various cross members. The top sections of each mast shall preferably have a "V" shaped profile which shall be oriented perpendicularly to the track direction so as to conform to shape of the bottom of the carriage 2 to allow passage of said carriage(s) 2 over each mast 36 without touching, and also so as to provide an open rectangular trough area 37 at the central section of each mast that shall accommodate and support elements of the drive cable assembly 5 that is further explained and described later. As shown in FIG. 3, four (4) guy wire anchor cables 53 shall extend from the sides of each mast 36 near its top four corners to the ground at points distant from track so as to stabilize the track masts 36 against movement in any direction.

The standard mast configuration shall be a single vertical ground post with said "V" shaped top section, so as to form an overall mast with "Y" shape profile. However, in another embodiment, for use with larger and wider balloon-carriage assemblies, the track mast shall include dual ground posts positioned on either side of the "V" shaped top section so as to create an overall "M" shape profile 36a (shown in FIG. 6) for greater stability. Furthermore, said "M" shaped version of the track support mast of the present invention shall be advantageous in applications whereby each of the two (2) parallel rows of said ground masts may be aligned and positioned to either side of a conventional roadway or railway system, thus allowing the track system of the present invention to be positioned overhead said roadway or railway, to allow sharing of the same real estate corridor.

Under normal operation, as the balloon car traverses the track system, the balloon car shall actually exert a small upward net-lift force upon the track system at its points of contact with the track system (i.e. at the trolley guide wheels 44 and stabilizer arm wheels 59). Therefore, in principle, the various primary elements 34, 35, 36 of the track system 4 don't really need to be of especially robust construction. The structural design of the track system needs only to be robust enough to support the weight of its own track members, and not the weights of the balloon car 1 or balloon train 100 and its cargo. This quality implies significant construction cost savings, and the present invention shall claim this advantage, especially for niche applications in freight transport where safety is not of utmost priority. Nevertheless, for other applications in the transport of human passengers, the track system 4 of the present invention shall preferably be of robust construction and designed to support not only its own weight, but also to support the combined weights of the balloon-car (or balloon-train) and its cargo, in the emergency event where the balloon apparatus of the balloon car might become deflated and lose all lift capability.

Furthermore, the track system masts 36 shall be of special design so as to not obstruct the motion of any moving parts. Each moving part shall include: a) the carriage 2 bottom hull, b) the carriage bottom keel 26, c) the trolley guide wheel axles 45, d) the vertical linkage elements 46a, 7 from the carriage 2 to the trolley guide wheel axle 45, e) the vertical linkage members 46b, 7 from the guide wheel axles 45 to the drive cable 5, e) the drive cable 5 itself (both supply & return strands), f) the carriage's stabilizer arms 29 and g) stabilizer arm idler wheels 59 , and, finally, h) the balloon 'nose-wire' tether lines 17.

Carriage-Trolley Track Connection

Each carriage 2 of the Balloon Car 1 or Balloon Train 100 of the present invention shall be connected, at both its front and rear ends, to two (2) of the previously described trolley guide wheel assemblies 8 (one at each end), with said trolley wheel assemblies being secured to the main trolley guide track 34 as previously described. Said connections shall be made by short and strong and flexible linkage chains 7, which are attached to the eye-rings 54 at both the front and rear ends of each vertical keel 26 that runs along bottom centerline of each carriage 2, and which are extended downward and attached at their other ends to similar eye-rings at the ends of previously described upper axle yokes 46a of each trolley wheel assembly 8. Said linkage chains 7 shall be constructed of steel chain (or equivalent) and said attachments shall also be made by chain link (or equivalent).

In the emergency situation where the balloon apparatus 3 may become deflated of its lifting gas, the flexible linkage chain 7 and loose eye-ring connection 54 shall allow the carriage keel 26 to drop below the level of the main trolley guide tracks 34 such that the carriage 2 bottom hull can drop to the level of the above described 'cradle rest' cables 38 and thereby be safely supported in a normal position (shown in FIG. 7).

Furthermore, each linkage member 7 can be modified to include an electronic instrument (load cell) 56 that shall be used to measure the tension force imposed on each connector cable, thus effectively measuring the net 'lift' force of the balloon car as imposed on that individual trolley wheel linkage assembly (see INSTRUMENTATION).

Carriage-Stabilizer Track Connection

As previously described, four (4) stabilizer arm assemblies 29 shall extend outward and downward from the four corners of each carriage 2, and said stabilizer arms shall interact with the previously described two parallel stabilizer tracks 35 of the track system 4, so as to keep the carriage vertically upright and also to stabilize the carriage against undesirable sideways tilt or rocking motion. Each stabilizer arm assembly 29 shall include four (4) brace members 57 which are firmly attached to the carriage frame and arranged into a tripod formation as shown in FIG. 3C. Each stabilizer arm 29 shall be a rigid steel rod, which shall be attached to said brace members 57 via a hinged clevis joint 58 that is affixed to the tripod brace formation at its apex. The axles of each said clevis joint 58 shall be oriented horizontally and in parallel with the track direction, so as to allow pivot of each stabilizer arm 29 through an arc, which passes through a vertical plane that is perpendicular to the track. In this arrangement, each of said clevis joints 58 (shown in FIGS. 5, 6A, 6B) shall in effect serve as the 'elbow' joint of each stabilizer arm assembly 29. Furthermore, the unattached terminal end of each stabilizer arm 29 shall serve as a fixed axle for a freely rotating wheel 59, which shall be mounted and secured to the end of each stabilizer arm via common bearing assembly (not shown). Said wheels 59 on the terminal axle-ends of each of the four carriage stabilizer arms 29 shall ride linearly against the flat underside surfaces of the two parallel sloped stabilizer tracks 35.

Furthermore, said carriage stabilizer arms 29 shall each be 'spring loaded' so as to cause their terminal ends with roller wheels 59 to press with force against said underside surfaces of their respective stabilizer tracks 35, thereby allowing the carriage 2 with four (4) of said stabilizer arm assemblies to effectively 'grip' onto the two (2) parallel stabilizer tracks, thereby keeping the carriage upright. A tension spring element 60 shall be affixed at one end to the middle of each carriage stabilizer arm 29, and the other end of each spring shall be stretched and firmly attached to the frame of the carriage 2 at the side of the carriage and at a point in close proximity to where the centermost brace 57 of the respective stabilizer arm's tripod brace formation is also attached to the carriage frame.

Furthermore, the point of junction of each of the above described tension spring elements to the carriage frame shall also serve as a convenient means and location for the installation of an instrument (load cell) 56 that shall be used to measure the tension force imposed on each spring, which shall be an indication of the lateral force imposed upon the balloon 3 by prevailing cross winds (see INSTRUMENTATION). The tension spring element 60 of each stabilizer arm assembly shall be of heavy duty design and it shall have a high spring constant (i.e. shall be very 'stiff') so as to require great force to stretch it and thus allow the stabilizer arm 29 to rotate outward about its clevis 'elbow' joint 58. However, each of said tension springs 60 of each stabilizer arm assembly 29 shall be sized and/or adjusted such that it imposes little or no force on the stabilizer arm when the carriage is vertically upright in the absence of cross winds.

The clevis 'elbow' joint 58 and tension spring 60 of each stabilizer arm assembly 29 are preferred embodiments to dampen small deflections so as to provide for smooth ride and/or passenger comfort, but alternatively, these can be eliminated in an another embodiment and the entire stabilizer arm assembly may instead be fixed and rigid, except for the freely rotating wheel 59 (shown in FIG. 5).

During normal operation (i.e. with no cross-winds), the wheels 59 of each stabilizer arm assembly 29 shall barely press against the stabilizer track channels 35, and as such will not impede lift of the balloon car nor add to frictional resistance imposed by the track upon the wheels. The tension springs will be sized to this minimum length at their relaxed (non-stretched) condition. However, in presence of cross winds, the wheels 59 of said stabilizer arms 29 and track channel 35 on the upwind side (only) will react against each other with the same total force that the wind imposes upon sides of the balloon 3 and carriage 2. The tension spring 60 will exert equal and opposite counteracting force proportionate to the amount of stretch.

Cable Drive Assembly

The entire balloon-car 1 or Balloon Train 100 of the present invention shall preferably be propelled via direct pull by an externally-driven steel cable (wire rope) 5 which is arranged into an 'endless loop' that extends continuously throughout length of the track system, with both the supply 5a and the return 5b strands of said cable loop being arranged in parallel with each other, one above the other, and with both cable strands supported atop rollers 61 that are mounted to each track mast 36 with said rollers being positioned within the previously described open trough area 37 at center of each track mast, and with said cable support rollers having a concave parabolic or trapezoidal profile, so as to encourage the cable 5 to ride at their centers.

As shown in FIGS. 5 and 6A, said cable support rollers 61 shall generally be oriented horizontally across the gap of said open trough area 37 so as to accommodate straight linear track orientation and/or gradual incline changes (up or down) in the vertical plane.

However, as shown in FIG. 6B, in one preferred embodiment of the present invention, said cable support rollers 61 may also be oriented at different angles across the gap of the trough area 37 at the mid-section of each track mast, so as to allow gradual track curvature (to left or right) in the horizontal plane, and yet still provide continuous support of both strands of the drive cable 5 throughout said turns. In cases of track curvature, consecutive track masts around each wide turn shall be spaced closer together and the axis angles of the axles of said cable support rollers 61 at each consecutive track mast 36 shall be changed in gradual increments relative to the mast itself so as to accommodate necessary and equal curvature in the path of the drive cable loop 5. The angle of each consecutive cable support roller 61 shall be adjusted such that its axis is perpendicularly opposed to the combined net lateral force vector imposed on each cable at that specific point under the influence of both gravity (i.e. its weight) in the downward direction, and tension applied to the cable (at both terminal ends of the track system) in the longitudinal direction. Each support roller 61 shall preferably be constructed of a durable hard polymeric resin and shall include a wheel bearing assembly so as to minimize rolling friction.

The cable loop is preferably driven by motorized pulleys 66 at either or both of two motor rooms 62 located at the two extreme ends of the track system, and said motors 11 and motorized pulleys 66 shall be capable of operating in either direction, so as to enable operation of the balloon-car 1 in either forward or reverse direction.

In addition to the previously described cable loop 5 and cable support rollers 61, as shown in FIG. 9, the cable drive assembly shall include the following seven (7) primary elements at preferably both of two (2) motor rooms 62 located at each terminal end of the track system 4: a very large electric motor 11 (either AC or DC), an AC variable frequency electronic drive speed controller 64 (if AC option), a gearbox 65 (gear reducers from motor speed to pulley speed), a large cable drive pulley 66, two (2) stationary idler cable pulleys 67, and at least one tensioning cable pulley 68 attached to a tensioning spring 69. Said drive motor, its gearbox, and all described cable pulley assemblies shall be firmly anchored to the floor of each motor room 62.

The tensioning pulleys 68 and tensioning springs 69 shall be dimensioned and positioned so as to enable them to take up slack in the drive cable loop that will naturally develop due to thermal expansion (elongation) of the steel cable with ambient (climate) temperature change and with varied exposure to sunshine, and also slight elongation of said cable due to the stress of pulling load.

Specific design of said motor rooms 62 is not especially pertinent to the present invention except that they must be located separately at both extreme ends of the track system, at points distant and further down-line from the previously described terminal stations, and that they shall preferably be elevated above grade to the same general elevation as the track system. The buildings to house said motor rooms with all of the previously described equipment must be of sturdy design and have a roof and walls for weather protection (wind, rain, etc.). The extreme end locations of said motor drives buildings is to provide sufficient room for the front and rear ends of the balloon 3 and also the balloon's front and rear nose-wire cables 17, which shall both project out significantly ahead of the cargo carriage(s) of the balloon car or balloon train when they are stopped at either terminal station. Two very large electrical substations (by others) which shall supply electrical power to both the motor rooms and terminal stations shall preferably be located in close proximity to both of these buildings. Electric power and instrument wiring between these electrical substations, the motor rooms, and nearby terminal stations shall be hard-wired.

Carriage-Drive Cable Connection

Each carriage 2 of each balloon car or balloon train shall be independently linked to the same common drive cable 5, so as to simultaneously propel all carriages at the same identical speed as the cable, and also so as to maintain relative positions (spacing) of said carriages with respect to each other as they are mutually propelled across the track system. Each carriage 2 shall be flexibly and indirectly linked to the top strand of the drive cable loop 5 at both front and rear ends of each carriage via co-linkage of said drive cable to each of each carriage's two (2) trolley guide wheel assemblies 8 via separate linkage chains 9. Said linkage chains 9 shall be short and attached at their upper end to the eye-ring at the end of each downward pointing axle yoke 46b of each trolley wheel assembly 8. Said linkage cables 9 shall preferably be attached at their lower ends to the top strand of drive cable 5a via usage of special 'tee clamp' connectors 10 that are bolted onto the drive cable 5a in sleeve-like fashion. The 'tee' branch of each said tee clamp 10 shall be oriented upward and provided with an eye-ring for attachment to said linkage chain 9. The special tee clamp with flared end openings and branched eye ring connection is preferred so as to minimize stress and damage to the drive cable 5 upon repeated flexure of said linkage elements, and its rounded exterior shape is preferred so as to enable the clamp to pass over the cable support rollers 61 at each track mast. However, any other conventional means of connecting perpendicularly to a steel cable may be used that is consistent with the present invention.

As the drive cable 5 moves forward, the 'Tee' clamp 10 impels all linkage chains 9 to move forward also, which in turn causes the trolley guide wheel assemblies 8 to move forward, which in turn causes balloon-car 1 to move forward. The vertical down-force imposed by each linkage cable 9 upon their respective trolley wheel assemblies 8 shall partially offset the net lift of the balloon-car 1 or balloon train 100, but the upward lift force of the balloon car shall be greater, so as to cause the wheels 44 of each trolley wheel assembly 8 to ride firmly against the top inner walls of their respective trolley guide track channels 34 at all times (shown in FIGS. 7 and 11).

Balloon-Track Connection

The balloon apparatus 3 of the balloon car or balloon train shall also preferably be linked to the trolley guide track 34, so as to keep the balloon horizontally level and in-line with the track while in motion. Steel 'nose-wire' cables 17 shall be extended from both the front and rear ends of the balloon downward to separate individual trolley wheel assemblies 8 engaged in their respective trolley guide track channels 34 at points well upstream and downstream of the balloon such that said nose-wires make roughly a 45° angles to horizontal. Said trolley wheel assemblies 8 shall be of identical design and construction as those described earlier for securing the carriage(s). Said nose wire cables shall preferably be constructed of steel cable, or equivalent, and shall connect at their upper ends to the eye rings 74 at each balloon-end's bra cap 16, and they shall be attached at their lower ends to eye rings at ends of the upper axle yokes 46a of their respective trolley guide wheel assemblies 8.

Furthermore, the points of junction of each of the above described nose-wire elements to the balloon shall also serve as a convenient means and location for the installation of an instrument (load cell) 56 that shall be used to measure tension force imposed on each nose-wire. (see INSTRUMENTATION).

Balloon-Drive Cable Connection

Furthermore, the balloon apparatus 3 of the balloon car or balloon train shall also preferably be linked to the drive cable 5, so as to keep the balloon in constant relative position to the carriage(s) as they are both (all) propelled simultaneously across the track system. The lower axle yokes 46b of each nose-wire 17 cable's trolley wheel assembly 8 shall be linked to the main drive cable 5 in identical fashion as the carriage's trolley wheels, using the same previously described linkage chain 9 and special cable tee clamp 10 with eye-ring connection. As the drive cable 5, carriage 2, and balloon 3 move forward in unison, so shall the nose-wire cables 17.

Terminal Stations

Two (2) terminal loading and unloading stations shall be located separately at each end of the track system 4, and they would preferably be located at popular origin and/or destination points, and they shall include, but not be limited to, at least six (6) primary components (not shown): an elevated boarding & loading platform(s) (one per carriage), retractable boarding ramp(s) from each platform to each carriage, passenger & cargo elevator(s) from ground level to each of said elevated boarding platform(s), one control room, one ballast water transfer system, and finally, ground-based parking and arrival/departure facilities. Specific design of these systems is not especially pertinent to the present invention except that the boarding platform(s) must be elevated to the track's level, and that the terminal station buildings to house all of above must be of sturdy design and have a roof and walls for weather protection (wind, rain, etc.). Said boarding platform(s) and/or ramp(s) shall also preferably include a roof overhang(s) and/or canopies to protect passengers and cargo from rain. Furthermore, in a previously described embodiment of the present invention, a canopy top 25 may be rolled out from the carriage. Other secondary components of each terminal station may optionally include common amenities such as lighting, plumbing, and HVAC, and may optionally also include vending services, work/storage spaces, offices, and other supporting equipment.

Control Room

A control room (not shown) in at least one terminal station is a primary component which shall house at least one human operator and various electrical and electronic equipment (not shown) such as, but not limited to, a main systems controller, and communications equipment including, but not limited to, an RF transceiver with RTU interface, assorted display panels with operator-interface controls, and general amenities for the operator. Said equipment may also optionally include audio/video communications equipment.

Ballast Water Transfer System

The ballast water transfer system (not shown) at each track terminal station shall include the following components (not shown): a large water reservoir tank with inlet and outlet nozzles, a water transfer pump, and water supply and return piping manifolds, each with a plurality of nozzles with automated valves, hose connections, and water transfer hoses. When the balloon car or balloon train is stopped and parked at a terminal station, said water transfer hoses shall be connected from one or more of the supply manifold pipe nozzles to the inlet nozzles 28 of each ballast tank 27 at each carriage 2, and separate hoses shall also be connected from the outlet nozzle of each ballast tank at each carriage to the return manifold nozzles of the reservoir tank. Specific design of each of above described components shall be standard in the art and are not really pertinent to the present invention.

Instrumentation & Control

Load Cells

In a most preferred embodiment of the present invention, the instrumentation devices on-board the balloon car or balloon train shall preferably include, but not be limited to, a plurality of piezoelectric force sensors (load-cells) 56 that shall be installed at each of the previously described linkage members from the balloon 3 and each carriage 2 to their respective trolley wheel assemblies 8, and also load cells 56 installed at the tension spring element 60 of each stabilizer arm 29 of each carriage 2. Said load-cell sensors shall all be of the tension type, and shall preferably have pipe thread fittings at both ends for convenient coupling in series with their respective linkage members as shown in FIG. 7. The force signal outputs from said load cells shall be used to measure and calculate the total net up-lift force exerted upon the track by the entire balloon car 1 or balloon train 100, and said load cells shall also be used to measure and calculate total lateral forces exerted upon each stabilizer track element 35 by the balloon car in the presence of cross-winds. On-board instrumentation shall also preferably include helium gas temperature and pressure sensors (not shown) as part of the balloon apparatus.

Furthermore, other instruments (not shown) on-board each carriage may optionally include an automated valve on at least one inlet or outlet nozzle 28 of the ballast water tank 27 of each carriage 2, and also an automated helium make-up valve. Furthermore, on-board instrumentation may optionally include any variety of air speed and weather monitoring devices, automated carriage door operators, and audio/video communication devices that are standard in the art (not shown).

Telemetry

Instrument signal transfers, and/or other communications between the balloon car and the remote control room(s) at the terminal station(s) shall preferably be accomplished via radio or satellite telemetry. Said telemetry systems (not shown) are commercially available and typically include electronic controllers at each carriage and also at each control room, with each of said controllers also interfaced with a radio transceiver to relay information back and forth. Furthermore, each of said transceivers shall also be interfaced with another device commonly called a Remote Terminal Unit (RTU) to analyze and reformat the data into form that can be used by the electronic controllers.

Cable Drive Control

In a most preferred embodiment of the present invention, control of the cable drive system (direction & speed) shall be performed by an electronic controller (not shown) located at a remote control room at a terminal station. Each controller shall strive to follow a programmed optimal speed ramp profile for the balloon-car or balloon train. However, said master controller shall also continuously monitor the signal outputs from the plurality of instruments on-board the balloon-car. If said instruments indicate any problem, the master controller shall automatically cause the cable drive to slow down and/or stop, which shall in turn cause the balloon car to slow down and/or stop.

Ballast Control

As passengers and/or cargo are simultaneously loaded and unloaded onto and from each carriage of the balloon car or balloon train while stopped at the boarding platform of a terminal station, the previously described electronic controller at the control room shall continuously monitor signals from the previously described plurality of load cell force sensors 56 on-board the balloon car and shall manipulate the automated valves at the nozzles of each supply and return manifold of the ballast water transfer system, so as to continuously adjust and maintain optimum net lift of each carriage. Once boarding and loading operations have been completed, the valves at inlet and outlet of each ballast tank of each carriage shall be closed and the transfer hoses manually disconnected by a human field operator. The balloon car or balloon train is now ready to commence with return trip.

Said optimum net lift force shall be significantly less than the true weight of the carriage and its cargo (i.e. if no lifting balloon were provided) so as to reduce frictional resistance forces exerted by the track system upon the trolley guide wheels 44 and stabilizer arm wheels 59, which shall in turn reduce the energy required to propel the balloon car or balloon train along the track system. However, said optimum net lift shall be sufficient to keep all carriage trolley wheels 44 lifted against the upper walls of their respective trolley guide track channels 34 at all times so as to provide stability to the carriage(s) 2. Furthermore, in emergency situations (i.e. extremely high winds or balloon deflation), this master controller may also be optionally used to 'auto-dump' all or part of the ballast-water from the ballast 27 of each carriage 2 while in-route between terminal stations. It shall accomplish this via relay of its output signal through a second 'slave' controller located on-board each carriage of the balloon car or balloon train, which in turn shall activate an automatic valve at the ballast water tank's outlet nozzle 28.

Alternative Stabilizer Tracks

In a preferred alternative embodiment of the present invention, the two previously described rigid and parallel stabilizer tracks 35 may be replaced with alternate stabilizer 'cable-tracks' 75 of different design (shown in FIGS. 9 and 11), but whereby said alternate stabilizer 'cable-tracks' shall still be consistent within the principle and scope of the 'triangulated' track system of the present invention.

Figure 10A:
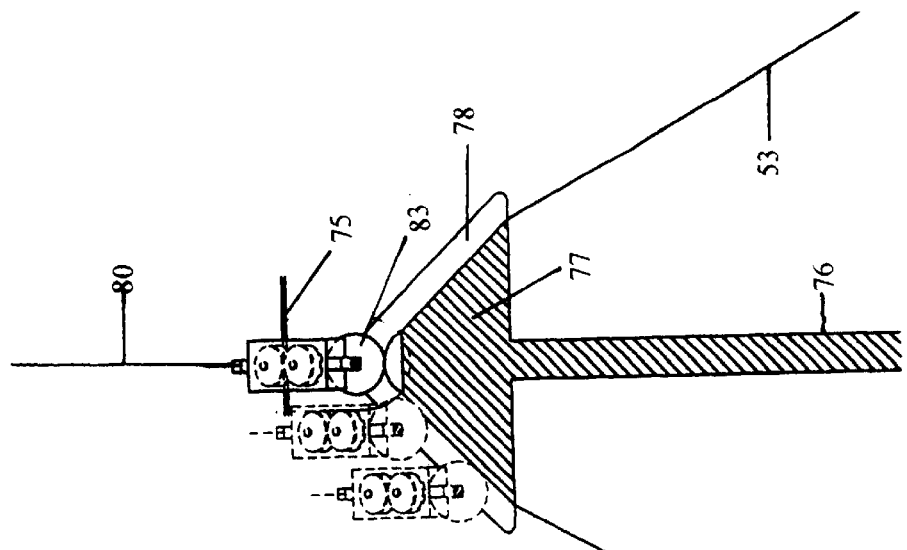
FIG. 10 illustrates an enlarged front view of one of the alternative stabilizer cable-tracks with alternative stabilizer cable-track support mast, and also showing the special cable-trolley assembly secured about the cable of said alternate stabilizer cable-track with external roller wheel which impacts and rolls over said support mast, and FIG. 10A showing a side perspective view of said stabilizer cable-trolley assembly.
Figure 10:
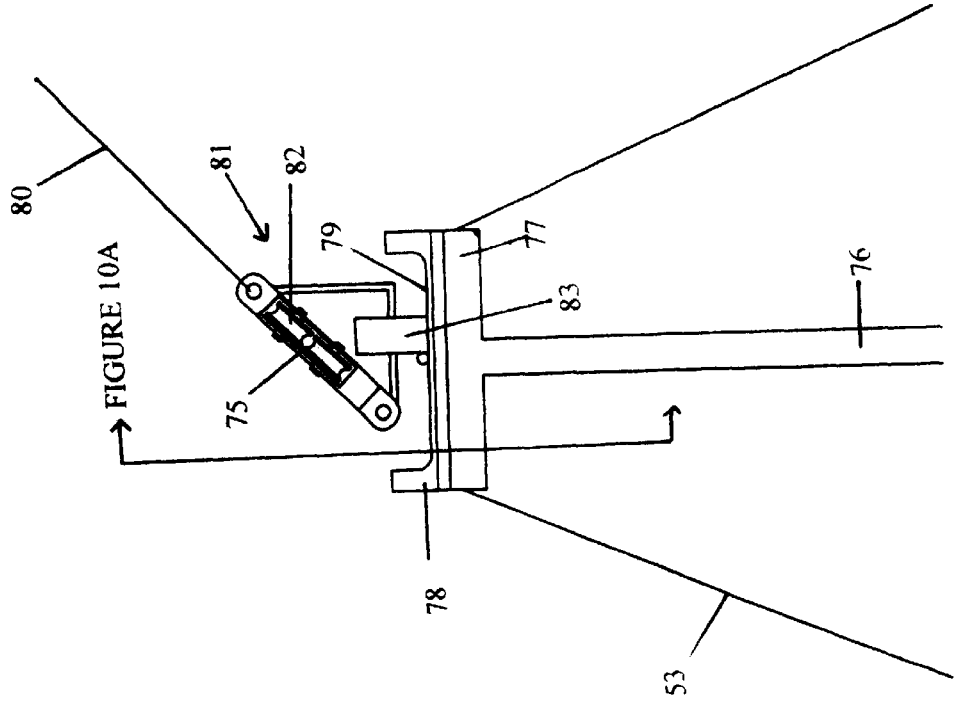

In the same preferred alternative embodiment of the present invention, the previously described carriage stabilizer arms 29 and stabilizer arm wheels 59 may likewise be replaced with alternate design elements 80, 81 that shall serve the same function (shown in FIGS. 10 and 10A). These alternate stabilizer tracks and alternate carriage stabilizer elements are further explained and described below.

As shown in FIGS. 9 and 11, the previously described two rigid stabilizer tracks 35 may be replaced with two stationary, but flexible, heavy-gauge steel cables 75, which are each securely fastened at both terminal ends of the track system 4, and which are arranged to run in parallel with the main center-line trolley guide track 34, but at significant and equal distances away from, and to each side of, said central trolley guide track 34, and also at a lower elevation. These heavy 'cable-tracks' 75 shall preferably be made of heavy-duty steel cable (wire rope) so as to enable them to withstand high tension in both the axial and lateral directions. Each of these two (2) alternate 'cable-tracks' 75 shall be supported by its own set of two (2) groups of a plurality of vertical masts 76, which are spaced at regular intervals along the full length of the track system, and which are arranged in parallel to the central trolley guide tracks 34 and track support masts 36 of the central trolley guide track 34, but at a wide and equal distance away from, and to both sides of, said central trolley track system. The vertical support masts 76 for these two (2) alternate stabilizer 'cable-tracks' 75 shall be made of rigid steel or equivalent, and they shall each have horizontal cross members 77 at their tops arranged into a 'Tee' profile, with said horizontal cross members oriented perpendicularly to the direction of the track system. The heavy cables of the two alternate 'cable-tracks' 75 shall each be strung perpendicularly across the tops of these horizontal 'tee-rest' cross members 77, However, said cable-tracks 75 shall not be fastened down to said horizontal 'tee-rest' cross members 77, but rather, they shall merely lay across said tee-rests 77. Furthermore, the steel cables 75 shall be taught in the horizontal and linear direction due to considerable tension applied to both ends of each cable, at both terminal ends of the track system in a deliberate and controlled fashion via the use of turnbuckle devices (not shown) or some other equivalent means.

The "tee-rest" cross members 77 at the top of each of said support masts 76 shall also preferably be constructed of steel or some other suitably strong and rigid material, and as shown in FIG. 11A, and they shall have a trapezoidal shape in cross-section as viewed perpendicularly from the side of the track system, with wide bottom, narrow top, and sloped sides. Furthermore, the tops of said "tee-rest" cross members at top of each track mast shall also preferably be fitted with curb elements 78 that are extended vertically upward to short heights above and at both sides of said horizontal 'tee-rest' cross members 77, which shall confine the alternate stabilizer cable-tracks 75 within the width of said 'tee-rest' cross members. Furthermore, the tops of each of said "tee-rest" cross members 77 at the top of each track mast 76 shall also preferably be fitted with rounded 'bumper' cushions 79 which shall made of hard rubber or other durable polymer known in the art, so as to minimize cable wear.

Furthermore, in this alternative stabilizer track embodiment of the present invention, the previously described carriage stabilizer arms 29 may alternately be replaced (in principle) by long steel cables 80 extended from all four corners of each carriage at their upper ends, to cable-trolley devices 81 at their lower ends, which shall ride along the above-described stabilizer cable-tracks 75. Said cable-trolley devices 81 shall preferably be a modified version of the standard double-pulley type, with two (2) freely rotating steel pulleys 82 that are fixed inside a small frame, and with the above described track cables 75 sandwiched between said pulleys 82. However, the outer frames of each of these cable trolleys 81 shall be extended at their bottom sides to support a separate axle upon which a third, larger, freely rotating wheel 83 is mounted externally to the frame. The axles of these external wheels 83 shall be oriented in a horizontal plane that is perpendicular to the heavy track cable 75, and also at roughly a 135° angle to the frame of each cable trolley assembly 81.

As each of said cable trolleys 81, rolling along it's respective cable-track 75 approaches a support mast 76, the large external wheel 83 at the bottom of the trolley frame will impact the sloped side of the mast's tee-top cross member 77. This shall cause the cable trolley 81 to roll over the bumper cushion 79, which shall in turn cause the trolley to lift the heavy stabilizer cable-track 76 off of the tee mast so as to let the cable-trolley assembly to pass by said tee-mast. The weight and applied tension of the heavy stabilizer track-cables 75 shall in turn impart tension to each of the carriage's four (4) side stabilizer cables, so as to stabilize the balloon car's carriage 2 against sideways movement in strong side winds.

Finally, in another preferred alternative embodiment of the present invention, in any aerial trolley where the track system has been modified to include said alternative 5 stabilizer cables 80 and alternative stabilizer 'cable-tracks' 76, the previously described main trolley guide track 34 and all trolley guide wheel assemblies 8 may optionally be deleted (shown in FIGS. 9 and 11), and the balloon 3 and each of its carriages 2 may alternately be secured directly to the drive cable 5, using same linkage chains 7,9 and cable 'tee' clamp 10 assemblies.

This modified track version with alternate stabilizer 'cable-tracks' 75 can present advantages of reduced track construction cost. However, these modified track versions will have reduced stability and comfort, and also the major disadvantage being strictly limited to straight-line travel only. This modified track version can accommodate gradual inclines and declines, but not turns.

Advantages

The present invention incorporates the 'lighter-than-air' attribute of airships and combines same with the stability, safety, and efficiency attributes of a fixed (to ground) and dedicated linear track system, and it also incorporates the efficiency of a direct-pull cable-propulsion scheme, so as to result in a novel new mode of transportation that is not only superior to airships, and far superior to all prior proposals for aerial trolley systems, but which is also superior to most other ground-based transportation modes as well, in terms of energy efficiency, stability, safety, and also passenger comfort. These attributes and their advantages are further explained below.

The 'lighter-than-air' attribute shall render the balloon-carriage or balloon train along with its laden cargo as virtually weightless, thereby minimizing frictional resistance forces imparted by the track elements upon the carriage's plurality of trolley wheels and stabilizer wheels which interact with said track elements. This shall in turn minimize the force and energy needed to propel the balloon car or balloon train across the track system. However, like airships, the present invention will admittedly suffer from significant air-drag frictional resistance as the large balloon and carriage(s) move through the surrounding air as the balloon car or balloon train traverses the track system. This undesirable attribute shall be minimized in three ways: by design of the balloon and carriage(s) to be aero-dynamically streamlined as previously described, by making the balloon and carriage(s) as large as economically and technically feasible, and finally, by operating the balloon car or balloon train at moderate speeds. Reasoning for the latter two strategies is as follows:

Air drag is proportional to the projected cross-sectional area of balloon, which is in turn proportional to the square of diameter of the balloon (the same is true of the carriage(s), but it's (their) contribution to air drag shall be negligible compared to that of the large balloon). However, lifting capacity of the balloon, and thus cargo capacity of the balloon car or balloon train, is proportional to the volume of the balloon, and it can be substantially increased at constant balloon diameter by increasing the balloon's length. Even if the balloon were spherical in shape (less aerodynamic), lifting capacity would be proportional to the cube of balloon diameter. Therefore, in either case, in terms of air-drag resistance force per unit of cargo capacity, an economy of scale exists (the larger, the better).

Air drag is also proportional to the square of velocity of the balloon through the air. Therefore, a trade-off exists between travel speed and energy usage. In niche applications where travel time is not especially important, such as in overnight freight delivery, the balloon car or balloon train may be operated very slowly, thereby reducing air-drag to an insignificant level, resulting in tremendous energy savings. In passenger transport applications, the inventor's calculations indicate substantial energy savings may still be achieved at reasonable operating speeds up to around 50–60 mph. Higher speeds shall be achievable, albeit at increased energy usage.

Furthermore, by securing the balloon car or balloon train to a fixed, ground-based track system, the present invention eliminates the 'fly-away' and crash-to-ground hazards associated with airships. This shall also eliminate the need for expensive ground mooring crews and also eliminate the need for complex aero-maneuvering procedures by skilled pilots required to land airships. The previously described 'cradle rest' optional feature of the track system of the present invention shall also represent a significant safety improvement as compared to free-floating airships.

Furthermore, the balloon car or balloon train of the present invention shall not require the complex and continuous ballast control typically required of airships, nor shall it require the complex condensation and recovery of water product of (fuel) combustion so as to compensate for weight loss of consumed fuel. Furthermore, and most importantly, the present invention shall not require the wasteful venting of expensive helium gas that is required by airships in order to descend from high altitudes.

Furthermore, the elevated (over obstacles) and dedicated track system of the present invention shall eliminate vehicle collision hazards typical of most conventional ground-based transportation systems. The dedicated and linear track system of the present invention, along with the co-linkage of all carriages of multiple balloon cars or multiple carriages of a balloon train to the same common propulsion cable, shall also allow uninterrupted, and continuous travel of the balloon car(s) or balloon train(s) between their originating and destination terminals. There is no need to slow down or stop to avoid inter-carriage or other vehicle collisions, which is a disadvantage typical of most other conventional ground-transportation modes. This will result in significant savings of both energy and time (of travel). So, even if the balloon car or balloon train of the present invention is operated at moderate speeds compared with other ground transportation modes, overall travel times will still be comparable due to the ability to travel in an uninterrupted fashion (no traffic jams).

The track system of the present invention with it's three parallel track members arranged into a 'triangulated' profile shall impart stability to the carriage(s) of the balloon car(s) or balloon train(s) against sideways tilt or rocking motion, which shall result in improved safety and passenger comfort. This attribute makes the present invention far superior to all prior proposals for aerial trolley systems.

Finally, the cable propulsion scheme of the present invention shall allow further and substantial energy savings and also reduced construction cost and also reduced operating cost. This direct-pull scheme is not only the most efficient means possible for transmitting energy into useful work (as opposed to aero-propellers or traction wheels), but it also permits usage of a fixed, remote drive motor, which in turn permits usage of a highly efficient and non-polluting electric motor (as opposed to relatively inefficient and highly polluting internal combustion engines typical of both airships and conventional ground transportation modes). Furthermore, the direct-pull cable propulsion scheme with remote drive motor allows elimination of the need for motors, propellers, and fuel onboard the balloon car or balloon train. Elimination of these on-board equipment and materials allows other significant advantages. First, elimination of these on-board equipment and materials, and also elimination of the structural elements to support them allows significant weight reduction of the balloon car or balloon train. This in turn not only allows additional cargo (payload) capacity for any given size of balloon apparatus, but it also reduces the work energy per unit of payload needed to propel the craft. Furthermore, the elimination of on-board flammable fuel eliminates a serious fire hazard. Finally, the direct-pull cable-propulsion scheme with remote, fixed drive motor also allows elimination of the need for a human operator aboard the balloon car or balloon train. Therefore, in addition to the claimed energy savings, these advantages shall also result in significant reductions of both construction cost and also operating cost.

The cable-propulsion scheme of the present invention will admittedly incur frictional resistance forces at the plurality of cable support rollers along the length of the track system, but these shall be minimized by usage of rollers with efficient bearing assemblies, and also by usage of the minimum necessary weight of drive cable. Preliminary calculations by the inventor indicate that said frictional resistance forces, imparted by the cable support rollers, shall be negligible.

The track system of the present invention shall admittedly represent a substantial capital cost investment for both the physical track and terminal structures, and also for the required real estate. Allocation of said real estate will also be required. Therefore, in some applications, economic and/or commercial feasibility of the present invention may indeed require public/governmental assistance in funding and land allocation, similar to what is. commonly done in the funding and routing of public roadway and railway infrastructures. However, if provided with comparable public assistance in building of the track infrastructure, the present invention shall be economically competitive to, if not superior to, these other modes of ground transportation (ca, bus, truck, train, etc.), in terms of cost per passenger-mile and cost per ton-mile for reasons previously described. This is especially true in cases where roadways or railways to the desired destination do not already exist, such as in routing across or to yet undeveloped areas, or, as an alternative to roadway widening projects in metropolitan areas to reduce traffic congestion. Furthermore, in many cases, the present invention shall have the advantage of being able to share the same real estate of existing linear roadway, railway, and perhaps even pipeline or power-line infrastructures. For example, the aerial trolley of the present invention can be built directly over or alongside said roadways, railways, etc. In the case of existing roadways with medians, the central track masts of the present invention may be located down the centerline of said medians, and the track system of the present invention shall be capable of merely passing over bridge or over-pass structures oriented either co-linearly with, or perpendicularly to said existing roadways. Furthermore, the aerial trolley of the present invention shall also have the advantage of being able to mount said track support masts atop existing structures (hills, overpasses, buildings, etc), with the aerial trolley track system capable of passing directly over said structures, without the need to destroy or disrupt said structures. One example of a niche application for the aerial trolley of the present invention would be in transit from building-top to building-top in large metropolitan areas.

While the above description contains many specifics, it should not be construed as limitation of the scope of the invention, but rather as an example of a preferred embodiment thereof. Many other variations are possible. It should be understood that the examples and embodiments described herein are for illustrative purposes only and that various modifications or changes in light thereof will be suggested to persons skilled in the art and are to be included within the spirit and purview of this application and the scope of the appended claims.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A stable and energy-efficient aerial trolley system for transporting human passengers and other cargo back and forth across land or shallow water bodies between two fixed terminal locations, comprising in combination:

a balloon apparatus filled with a lighter-than-air gas, the balloon apparatus having a forward aerodynamically extending outward nose portion;

a carriage assembly suspended from the balloon, with said carriage assembly including a portion to house and accommodate said passengers and cargo;

adjustable ballast means on said carriage for adjusting net-lift of the combined balloon-carriage assembly;

a track system for securing and guiding and propelling the carriage assembly in a stable fashion, the track system including a plurality of vertical masts at regularly spaced intervals with horizontal members at top sections of each mast a drive cable assembly including a continuous cable which is arranged into an endless loop between two fixed end-pulleys at both terminal ends of the track system, with a means for maintaining tension on said cable loop, and with at least one of said end-pulleys being driven by a motor;

said drive cable assembly, being oriented down the track centerline, with each of the two strands of cable loop being supported by an independent plurality of horizontally oriented rollers mounted upon the horizontal members of each said track support mast at regularly spaced intervals along length of the track system;

a forward extending carriage cable for securing at least one the front end of the carriage to said drive cable, to result in propulsion of the balloon-carriage assembly along the track system; and a forward extending balloon nose cable extended from the nose portion of the balloon, and independently attached to said drive cable, to keep the balloon in constant horizontal position relative to the carriage as the combined balloon-carriage assembly is propelled along said track system, the adjustable ballast means being used for the adjusting of the net-lift of the combined balloon-carriage assembly relative to the track system so as to provide stability to the carriage while the carriage is traveling along the track system.

2. The stable and energy-efficient aerial trolley system of claim 1, wherein the carriage assembly is attached to a bottom portion of the balloon frame by a hinge joint, wherein said hinge joint includes a hinge pin with sleeved hinge plates which connect to a top portion of the carriage and to a lower portion of the balloon frame, respectively, in alternating series.

3. The continuous, stable and energy efficient aerial trolley system of claim 1, wherein said adjustable ballast means includes:

a water ballast tank, on board the carriage, having internal means for reducing splashing effects, and nozzles for filling and emptying the tank when stopped at terminal locations in order to compensate for payload changes at said terminals and to adjust and optimize the net-lift of the combined balloon-carriage assembly relative to the track while the carriage is traveling along the track system.

4. The continuous, stable and energy efficient aerial trolley system of claim 1, wherein said linkage members from balloon and carriage to the drive cable are attached to said cable by a Tee clamp connector.

5. The stable and energy-efficient aerial trolley system of claim 1, wherein the rear end of the carriage and the rear end of the balloon are also secured to said drive cable by respective rearwardly extending cables, wherein the forward extending carriage cable and the forward extending balloon nose cable and the rearwardly extending cables from the balloon and the carriage all together eliminates fly-away and crash to ground hazards of the balloon and the carriage moving side to side by, and thereby enhancing ride stability and also permitting travel in the rearward direction.

6. The continuous, stable and energy efficient aerial trolley system of claim 1, wherein the elevated track system includes: a plurality of stationary cables extending continuously through the full length of the track system, and which are supported by and secured to the vertical track support masts, and which are arranged to form an emergency cable rest for support of a disabled balloon-carriage.

7. The stable and energy efficient aerial trolley system of claim 1, wherein the track system further includes a central trolley guide track assembly comprising:

two linear, rigid, and substantially C-shaped channels, which extend continuously in parallel down a centerline of the track system, at a slightly higher elevation than the drive cable, and with their concave sides facing each other;

said two C-shaped channels, wherein said channels are spaced apart by a small distance so as to form a continuous open vertical slot-way between said channels;

said two C-shaped channels, wherein said channels are mounted so as to provide an open space directly beneath said channels, at least to extend below drive cable.

8. The stable and energy-efficient aerial trolley system of claim 7, including a plurality of trolley guide wheel assemblies, each comprising:

two wheels mounted to both ends of a short axle in a freely rotating fashion, and whereby said wheels are secured by, and roll freely within, their respective C-channels of said main trolley guide tracks, and whereby said axle passes freely through the horizontal open gaps of the two opposing C-channels;

two connector-yokes extending perpendicularly outward from said axle at roughly 180° orientation from each other, which travel through said vertical slot-way between said C-channel tracks, for use in the simultaneous connections of each said trolley guide wheel assembly to both one overhead balloon or carriage assembly, and also to the below-positioned drive cable, in a freely rolling fashion.

9. The stable and energy-efficient aerial trolley system of claim 8, wherein the individual linkage members from both the balloon and carriage assemblies to the drive cable are each segmented into two parts, with its upper part connected at its lower end to the upper axle yoke of one said trolley wheel assembly, and with its lower part connected at its upper end to the lower axle yoke of the same trolley wheel assembly, thereby maintaining secure connections of said balloon and carriage to said drive cable, albeit indirectly through the secure co-attachment and co-linkage to said trolley guide wheel assemblies in a freely rolling fashion.

10. The stable and energy-efficient aerial trolley system of claim 9, wherein the carriage assembly includes an external keel extending longitudinally along its bottom centerline for attaching the carriage assembly to the track system and for positioning the carriage assembly when in motion along said track system.

11. The stable and energy efficient aerial trolley system of claim 7, wherein both the central trolley guide tracks include a means for accommodating gradual track curvature along the track system in both vertical and horizontal directions.

12. The stable and energy efficient aerial trolley system of claim 11, wherein said plurality of drive cable support rollers at spaced intervals along track length are sequentially mounted at different positions and angles relative to the track to allow continuous support of both strands of said pre-tensioned drive cable loop despite gradual curvature in said cables to conform to gradual curvature of the track system.

13. The stable and energy-efficient and elevated aerial trolley system of claim 1, wherein two flexible but heavy duty cables are stretched in parallel along a full length of the track system, at equidistant positions off-set from track centerline, and at above grade elevation, to serve as stabilizing track elements to prevent sideways drift and tilt motion of the carriage, with said stabilizer cable-tracks being fixed at both terminal ends of the track system, and supported by vertical T-shaped masts from ground at regularly spaced intervals along length of the track system, and whereby said cable-tracks are not fastened to said masts, but rather rest atop their T-top members under their own weight.

14. The stable and energy-efficient and elevated aerial trolley system of claim 13, wherein long flexible but lightweight cables extend from both sides of the carriage frame in outrigger fashion and connect to said two fixed stabilizer track cables via cable trolley assemblies, which are attached to the ends of each carriage outrigger cable, and which secure to said stabilizer track cables in a freely rolling fashion in the track direction.

15. The stable and energy-efficient and elevated aerial trolley system of claim 14, wherein said cable trolley assembly comprises two freely rotating pulley wheels about fixed axles inside a small frame, and whereby said pulley wheels straddle said stabilizer track cable in a snug manner on two opposing sides of said cable, so as to secure to said cable in a freely rolling fashion, and whereby said trolley frame has side openings for free passage of the stabilizer track cable.

16. The stable and energy-efficient and elevated aerial trolley system of claim 15, wherein said cable trolley includes a larger wheel mounted externally to the trolley frame such that the perimeter of said external wheel protrudes slightly beyond the trolley frame, and whereby said external wheel is positioned to be first trolley surface to impact the fixed tops of the stabilizer track cable support masts as the trolley rolls along said stabilizer track cable, and whereby said impact causes the trolley to roll over said mast top and also temporarily lift the stabilizer track cable off of said mast top, so as to allow passage of the cable trolley over said mast top.

17. A stable and energy-efficient aerial trolley system for transporting human passengers and other cargo back and forth across land or shallow water bodies between two fixed terminal locations, comprising in combination:

a balloon apparatus filled with a 'lighter-than-air' gas, the balloon apparatus having a forward aerodynamically extending outward nose portion;

a carriage assembly suspended from the balloon, with said carriage assembly including a portion to house and accommodate said passengers and cargo;

a track system for securing and guiding the carriage assembly in a stable fashion, the track system including two rigid stabilizer track elements, which extend continuously in parallel in the track direction, but which are equally off-set to both sides of track centerline;

a drive cable assembly having a drive cable being pulled by a motor;

a forward extending carriage cable for securing at least one (front) end of the carriage to said drive cable, to result in propulsion of the balloon-carriage assembly along the track system;

a forward extending balloon nose cable extended from the nose portion of the balloon, and independently attached to said drive cable, to keep the balloon in constant position relative to the carriage as the balloon apparatus and the carriage assembly is propelled along said track system; and rearwardly extending cables each extending from both a rear end of the carriage and from a rear end of the balloon, and both being secured to the drive cable, wherein the forward extending carriage cable and the forward extending balloon nose cable and the rearwardly extending cables from the balloon and the carriage all together eliminates fly-away and crash to ground hazards of the balloon and the carriage moving side to side by, and thereby enhancing ride stability and also permitting travel in the rearward direction.

18. A stable and energy-efficient aerial trolley system for transporting human passengers and other cargo back and forth across land or shallow water bodies between two fixed terminal locations, comprising in combination:

an aerodynamic balloon apparatus filled with a lighter-than-air gas;

a carriage assembly suspended from the balloon, with said carriage assembly including a portion to house and accommodate said passengers and cargo;

a track system for securing and guiding the carriage assembly in a stable fashion;

adjustable ballast means on said carriage, having internal means for reducing splashing effects, and nozzles for filling and emptying the tank when stopped at terminal locations in order to compensate for payload changes at said terminals and to adjust and optimize the net-lift of the combined balloon-carriage assembly relative to the track while the carriage is traveling along the track system; and a drive cable for pulling the balloon assembly and the carriage assembly along the track system.

* * * * *